US009387653B2

(12) United States Patent
Oomura et al.

(10) Patent No.: US 9,387,653 B2
(45) Date of Patent: Jul. 12, 2016

(54) PROTECTIVE LAYER TRANSFER SHEET, AND THE INTERMEDIATE TRANSFER MEDIUM

(71) Applicant: DAI NIPPON PRINTING CO., LTD., Tokyo (JP)

(72) Inventors: Junpei Oomura, Tokyo (JP); Kenzo Hayashi, Tokyo (JP); Mitsuhiro Oota, Tokyo (JP); Kano Sakamoto, Tokyo (JP); Shinya Yoda, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/779,137

(22) PCT Filed: Mar. 20, 2014

(86) PCT No.: PCT/JP2014/057888

§ 371 (c)(1),
(2) Date: Sep. 22, 2015

(87) PCT Pub. No.: WO2014/148631

PCT Pub. Date: Sep. 25, 2014

(65) Prior Publication Data

US 2016/0082707 A1 Mar. 24, 2016

(30) Foreign Application Priority Data

Sep. 30, 2013 (JP) ................................ 2013-205779
Mar. 20, 2014 (JP) ................................ 2014-057927
Mar. 20, 2014 (JP) ................................ 2014-057927

(51) Int. Cl.
*B32B 27/36* (2006.01)
*B32B 27/38* (2006.01)
(Continued)

(52) U.S. Cl.
CPC . *B32B 27/08* (2013.01); *B32B 7/06* (2013.01); *B32B 27/36* (2013.01); *B32B 27/38* (2013.01);
(Continued)

(58) Field of Classification Search
CPC .... B41M 5/382; B41M 5/38257; B41M 5/42; B41M 5/44; B41M 2205/02; B41M 2205/10; B41M 2205/40; B32B 27/36; B32B 27/38; Y10T 428/31511; Y10T 428/31515; Y10T 428/31786
USPC ......... 503/227; 428/32.51, 32.77–32.81, 413, 428/414, 490
See application file for complete search history.

(56) References Cited

U.S. PATENT DOCUMENTS 7,122,504 B2 * 10/2006 Watanabe ............ B41M 7/0027 428/195.1

FOREIGN PATENT DOCUMENTS

JP 1987-238791 A 10/1987
JP 1992-344289 A 11/1992
(Continued)

OTHER PUBLICATIONS

International Search Report mailed Jun. 24, 2014; PCT/JP2014/057888.

*Primary Examiner* — Bruce H Hess
(74) *Attorney, Agent, or Firm* — Ladas & Parry LLP

(57) ABSTRACT

The purpose is to provide a protective layer transfer sheet and an intermediate transfer medium, in which the protective layer has excellent foil tearing property during transfer and in which sufficient durability can be imparted to the thermally transferred image.

The above problem is solved by a protective layer transfer sheet in which a transferable protective layer (20) is provided on one surface of a substrate (1) so as to be peelable from the substrate (1), wherein the transferable protective layer (20) has a layered structure in which a first protective layer (3A), and a second protective layer (3B) which is in contact directly with the first protective layer (3A), are provided in this order from the substrate (1); the first protective layer contains an epoxy-cured resin in which a reactive resin having a functional group capable of reacting with an epoxy group and having a glass transition temperature (Tg) of not less than 60° C. is reacted with and cured by an epoxy curing agent; and the second protective layer (3B) contains a polyester resin having a number-average molecular weight (Mn) of not less than 8000 and a glass transition temperature (Tg) of not less than 45° C.

14 Claims, 3 Drawing Sheets

(51) Int. Cl.

| | |
|---|---|
| ***B32B 27/08*** | (2006.01) |
| ***B41M 5/44*** | (2006.01) |
| ***B32B 7/06*** | (2006.01) |
| ***B41M 7/00*** | (2006.01) |
| ***B41M 5/382*** | (2006.01) |
| ***B41M 5/50*** | (2006.01) |
| ***B41M 5/52*** | (2006.01) |

(52) U.S. Cl.

CPC ............ *B41M 5/38257* (2013.01); *B41M 5/44* (2013.01); *B41M 5/502* (2013.01); *B41M 5/52* (2013.01); *B41M 7/0045* (2013.01); *B32B 2307/412* (2013.01); *B32B 2307/748* (2013.01); *B41M 2205/02* (2013.01); *B41M 2205/10* (2013.01); *B41M 2205/36* (2013.01); *B41M 2205/38* (2013.01); *B41M 2205/40* (2013.01)

(56) References Cited

FOREIGN PATENT DOCUMENTS

| | | | |
|---|---|---|---|
| JP | 2004-351656 | A | 12/2004 |
| JP | 2005-113095 | A | 4/2005 |
| JP | 2008-238525 | A | 10/2008 |
| JP | 2010-221400 | A | 10/2010 |
| JP | 2012-051212 | A | 3/2012 |

* cited by examiner

PROTECTIVE LAYER TRANSFER SHEET, AND THE INTERMEDIATE TRANSFER MEDIUM

TECHNICAL FIELD

The present invention relates to a protective layer transfer sheet and an intermediate transfer medium.

BACKGROUND ART

Sublimation transfer method has been widely used for preparing printed articles since it can provide high-quality images of excellent transparency, and high reproducibility and high gradation of neutral tints, which are equivalent to the conventional full-color photographic images. As the printed articles, digital photographs, and ID cards which are used in various fields and known as identification card, driver's license card, membership card, and the like, are known.

In the case of image forming in accordance with the sublimation transfer method, a thermal transfer sheet that has a dye layer provided on one surface of a substrate, and a transfer receiving article, for instance, thermal transfer receiving sheet that has a receiving layer provided on one surface of another substrate, is used. The dye layer of the thermal transfer sheet is superposed on the transfer receiving article, and then, they are heated by a thermal head from the back face of the thermal transfer sheet so as to transfer dyes of the dye layer onto the transfer receiving article, and thereby a printed article in which an image is formed on the transfer receiving article is obtained. According to the sublimation transfer method, since it is possible to control the transferring amount of the dye dot unit by dot unit with varying the amount of energy applied to the thermal transfer sheet, it is possible to perform a density gradation. Therefore, this method can provide a high quality image which is very vivid, and excels in the transparency, and the color reproducibility and the gradient of halftones, and which is comparable to full-color photograph image.

In recent years, on any other than the thermal transfer image-receiving sheet material to form a thermal transfer image needs to correspond to the printed product, it has been proposed that the intermediate transfer medium is provided for releasably receiving layer on a base material (for example, the Patent literature 1). According to the intermediate transfer medium, dyes of the dye layer of the thermal transfer sheet is transferred onto the receiving layer of the intermediate transfer medium to form a thermally transferred image, and then the intermediate transfer medium is heated from the back face thereof so as to transfer the receiving layer onto an arbitrary-selected transfer receiving article, it is possible to obtain a printed article where the thermally transferred image is formed an arbitrary-selected transfer receiving article.

In the printed article which is obtained by forming a thermal transfer image onto a receiving layer of the thermal transfer image-receiving sheet in accordance with the sublimation transfer system, or by forming a thermal transfer image onto a receiving layer of the intermediate transfer medium and retransferring the receiving layer onto an arbitrary-selected transfer receiving article, the receiving layer on which the thermally transferred image has been formed is located on the outermost surface of the printed matter. Although the thermal transfer image which is formed on the receiving layer in accordance with the sublimation transfer method is excellent in the formation of gradation image as mentioned above, the obtained printed article suffers with a problem of lack of durability including plasticizer resistance, abrasion resistance and solvent resistance, since the print is formed with dyes which each has a relatively low molecular weight, and they are different from the conventional printing ink which are made of pigments, and they does not have a vehicle.

Therefore, recently, a method of forming a protective layer, in which a protective layer transfer sheet having a protective layer is superposed on the receiving layer of the thermal transfer receiving sheet onto which a thermal transfer image has been formed, then the protective layer is transferred onto the receiving layer by using a thermal head or heating roll or the like, thus, the protective layer is formed on receiving layer of the thermal transfer receiving sheet onto which a thermal transfer image has been formed, has been known. It is possible to improve the durability of the image by forming such a protective layer on the image. With respect to the intermediate transfer medium, similar attempts have been made, for example, in the Patent literature 2, an intermediate transfer medium, where a peeling layer, a protective layer, and a layer functioned both as receiving layer and adhesive layer is provided on a substrate, has been proposed. According to this intermediate transfer medium, it is said that it is possible to impart durability to the thermal transfer image, since the protective layer is located on the surface of the receiving layer onto which the thermal transfer image has been formed, after the receiving layer onto which the thermal transfer image has been formed, and the protective layer are transferred on a certain substrate.

Further, in the Patent literature 3, a protective layer transfer sheet wherein a thermosetting type transparent resin layer, as a transferable resin layer, which comprises an acrylic polyol resin and a curing agent, and a thermally adhesive resin layer are laminated on a substrate film in this order has been proposed.

PRIOR ART LITERATURE

Patent Literature

Patent Document 1: JP SH062-238791 A
Patent Document 2: JP 2004-351656 A
Patent Document 3: JP 2008-238525 A

SUMMARY OF THE INVENTION

Problems to be Solved by the Invention

Incidentally, in the case of using a protective layer the main purpose of which is to improve the durability, the foil tearing of the protective layer becomes poor. Thus, when the protective layer of the protective layer transfer sheet is, or a receiving layer of the intermediate transfer medium on which the thermal transfer image has been formed and a protective layer are, transferred onto a transfer receiving material, blooming in the protective layer to be transferred, and/or transfer failure at the end of the transferred portion are caused. Although it is conceivable to reduce the thickness of the protective layer in order to improve the foil tearing property, however, the lowering of the layer thickness of the protective layer brings about the lowering of durability.

As an important function required for the protective layer, the foil tearing is mentioned in conjunction with the above mentioned durability. However, there is a trade-off relationship between the durability and the foil tearing. When improving the durability of the protective layer, the foil tearing of the protective layer has deteriorated. Therefore, it is impossible to satisfy both the durability and the foil tearing in one protective layer up to the present. Further, when releasability of the protective layer from the substrate is low, it might also cause a problem such that a part of the protective layer is not transferred. Thus, it is also important to improve the releasability of the protective layer from the substrate.

According to the protective layer transfer sheet which has been proposed in the Patent literature 3, it is said that it is possible to satisfy both of durability and the foil tearing property (it is referred to as "cutting-property" in the Patent literature 3). However, in general, the protective layer which contains a curing type resin where a predetermined resin is cured by a predetermined curing agent has a low interlayer adhesiveness with the layer in contact directly with the protective layer, for example, an adhesive layer which is provided on the protective layer, or a layer which is referred to as "primer layer". Thus, when the transferable protective layer (it corresponds to the transferable resin layer in the Patent literature 3) which has been transferred onto the image undergoes rubbing, the protective layer may be peeled off from the image, and which is followed by a reduction in abrasion resistance. In addition, even when employing the protective layer which has been proposed in Patent literature 3 (it corresponds to the thermosetting type transparent resin layer in the Patent literature 3) in order to improve the foil tearing property of the protective layer itself, in the case that the interlayer adhesiveness between the layers which constitute the transferable protective layer is low, it is impossible for the layer in contact directly with the protective layer (it is corresponds to the thermally adhesive resin layer in the Patent literature 3) to follow the good foil tearing property of the protective layer. Thus, the foil tearing property of the entire transferable protective layer becomes low. Namely, in order to improve the foil tearing property of the entire transferable protective layer, and also improve the abrasion resistance, an improvement in the interlayer adhesiveness between the layers which constitute the transferable protective is considered to be important.

Furthermore, with respect to the thermosetting type transparent resin layer which comprises an acrylic polyol resin and a curing agent according to the Patent Literature 3, although it is excellent in the physical durability, it's chemical durability, for example, solvent resistance and plasticizer resistance, is not sufficient, and there remains a room for improvement. The same thing can be said of the intermediate transfer medium which has a transferring layer in which the protective layer and the receiving layer are laminated.

The present invention has been made in view of the above-mentioned circumstances, and the present invention aims principally to provide a protective layer transfer sheet and an intermediate transfer medium, each of which excels in the foil tearing on transfer, and can impart a sufficient durability to the thermally transferred image.

Means for Solving the Problems

An aspect of the present invention for solving the above-mentioned problems is a protective layer transfer sheet which comprises a substrate, and a transferable protective layer peelably provided on a surface of the substrate; wherein the transferable protective layer comprises a layered structure in which a first protective layer, and a second protective layer which is in contact directly with the first protective layer, are provided in this order from the substrate; wherein the first protective layer comprises an epoxy-cured resin in which a reactive resin having a functional group capable of reacting with an epoxy group and having a glass transition temperature (Tg) of not less than 60° C. is reacted with and cured by an epoxy curing agent; and wherein the second protective layer comprises a polyester resin having a number-average molecular weight (Mn) of not less than 8000 and a glass transition temperature (Tg) of not less than 45° C.

The weight average molecular weight (Mw) of the reactive resin may be not less than 15,000 and not more than 70,000. Further, the reactive resin may be an amino-modified acrylic resin.

Also, the content of the polyester resin may be not less than 30% by weight, on the basis of the total solid content of the second protective layer.

Another aspect of the present invention for solving the above problems is an intermediate transfer medium which comprises a substrate and a transfer layer which is peelably provided on a surface of the substrate; wherein the transfer layer comprises a layered structure in which a first protective layer, a second protective layer which is in contact directly with the first protective layer, and a receiving layer are provided in this order from the substrate; wherein the first protective layer comprises an epoxy-cured resin in which a reactive resin having a functional group capable of reacting with an epoxy group and having a glass transition temperature (Tg) of not less than 60° C. is reacted with and cured by an epoxy curing agent; and wherein the second protective layer comprises a polyester resin having a number-average molecular weight (Mn) of not less than 8000 and a glass transition temperature (Tg) of not less than 45° C.

Still another aspect of the present invention for solving the above problems is a protective layer transfer sheet which comprises a substrate and a transferable protective layer which is peelably provided on a surface of the substrate; wherein the transferable protective layer comprises a layered structure in which a first protective layer, and a second protective layer which is in contact directly with the first protective layer, are provided in this order from the substrate; wherein the first protective layer comprises a cured resin in which a reactive resin having a functional group capable of reacting with a curing agent is reacted with and cured by the curing agent; and wherein the second protective layer comprises a polyester resin having a number-average molecular weight (Mn) of not less than 8000 and a glass transition temperature (Tg) of not less than 45° C.

Further, the reactive resin having a functional group reactive with the curing agent may be an acrylic polyol resin having a glass transition temperature (Tg) of not less than 50° C. Also, the content of the polyester resin may be not less than 30% by weight, on the basis of the total solid content of the second protective layer.

Further, an aspect of the present invention for solving the above problems is an intermediate transfer medium which comprises a substrate and a transfer layer which is peelably provided on a surface of the substrate; wherein the transfer layer comprises a layered structure in which a first protective layer, a second protective layer which is in contact directly with the first protective layer, and a receiving layer are provided in this order from the substrate; wherein the first protective layer comprises an cured resin in which a reactive resin having a functional group capable of reacting with a curing agent is reacted with and cured by the curing agent; and wherein the second protective layer comprises a polyester resin having a number-average molecular weight (Mn) of not less than 8000 and a glass transition temperature (Tg) of not less than 45° C.

Further another aspect of the present invention for solving the above problems is a protective layer transfer sheet which comprises a substrate and a protective layer which is peelably provided on a surface of the substrate; wherein the protective layer comprises an epoxy-cured resin in which a reactive resin having a functional group capable of reacting with an epoxy group is reacted with and cured by an epoxy curing agent; and wherein the reactive resin has a glass transition temperature (Tg) of not less than 60° C.

The weight average molecular weight (Mw) of the reactive resin may be not less than 15,000 and not more than 70,000. Further, the reactive resin may be an amino-modified acrylic resin.

Also, between the substrate and the protective layer, a peeling layer may be provided so as to be peelable from the substrate.

Yet another aspect of the present invention for solving the above problems is an intermediate transfer medium which comprises a substrate, and a protective layer and an receiving layer which are layered on a surface of the substrate; wherein the protective layer is peelable from the substrate; wherein the protective layer comprises an epoxy-cured resin in which a reactive resin having a functional group capable of reacting with an epoxy group is reacted with and cured by an epoxy curing agent; and wherein the reactive resin has a glass transition temperature (Tg) of not less than 60° C.

Effect of the Invention

According to the protective layer transfer sheet, and the intermediate transfer sheet of any aspect of the present invention, it is possible to impart both of the foil tearing property and the durability, which are in a trade-off relationship, to the protective layer transfer sheet or the protective layer included in the intermediate transfer sheet. With respect to the protective layer transfer sheet, it excels in the foil tearing on transferring a protective layer to a receiving layer on which a thermally transferred image has been formed, and it can impart a high durability to a printed article in which the thermally transferred image has been formed. With respect to the intermediate transfer medium, it excels in the foil tearing on transferring a receiving layer, on which a thermally transferred image has been formed, and a protective layer onto a certain substrate, and it can impart a high durability to a thermally transferred image which has been formed on the receiving layer.

MODES FOR CARRYING OUT THE INVENTION

<<Protective Layer Transfer Sheet of the First Embodiment>>

Figure 1:
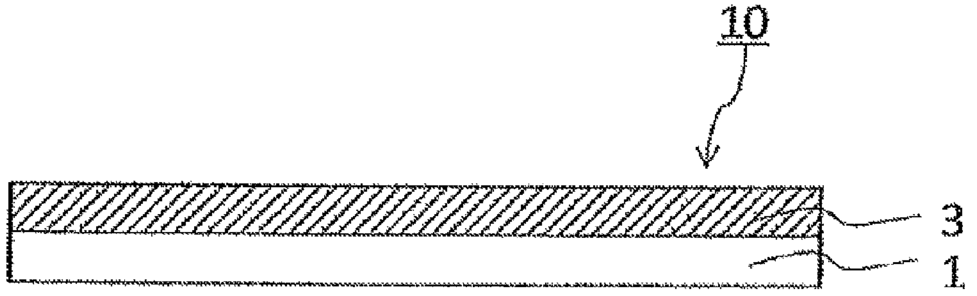
FIG. 1 is a schematic sectional view showing an example of the protective layer transfer sheet according to the present invention.
Figure 2:
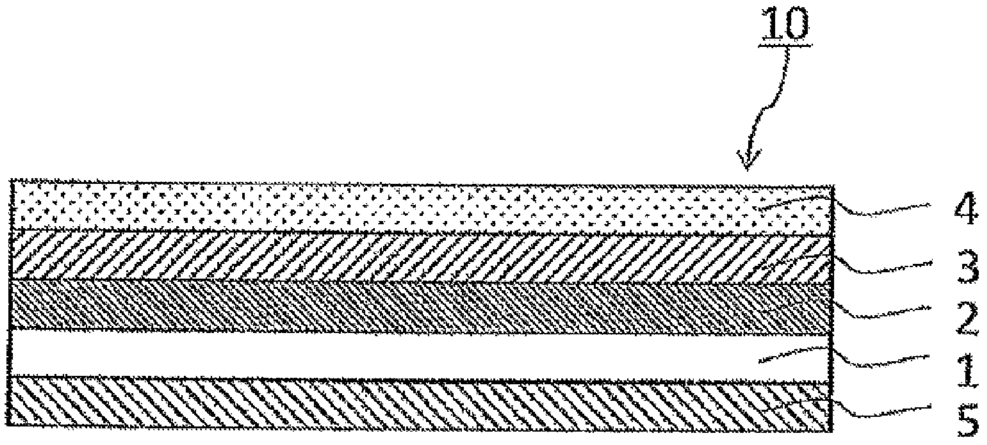
FIG. 2 is a schematic sectional view showing another example of the protective layer transfer sheet according to the present invention.

Now, the protective layer transfer sheet of the first embodiment according to the present invention will be described in detail. FIG. 1 is a schematic sectional view showing an example of the protective layer transfer sheet of the first embodiment according to the present invention. As shown in FIG. 1 and FIG. 2, the protective layer transfer sheet 10 of the first embodiment of the present invention comprises a substrate 1, and a protective layer 3 which is peelably provided on the substrate 1. The substrate 1 and the protective layer 3 are essential components of the protective layer transfer sheet 10 of the first embodiment of the present invention. In addition to these essential component, any optional layer(s) may be provided as shown in FIG. 2. Here, in FIG. 2, a peeling layer as an optional layer is provided between the substrate 1 and the protective layer 3, an adhesive layer 4 as another optional layer is provided on the protective layer 3, and a back face layer 5 as still another optional layer is provided on another surface of the substrate 5. Hereinafter, the components constituting the protective layer transfer sheet of the first embodiment of the present invention will be described in detail.

(Substrate)

The substrate 1 is an essential component of the protective layer transfer sheet 10 according to the first embodiment of the present invention, and it is provided for the purpose of supporting the protective layer 3, or the peeling layer 2 which is optionally provided between the substrate 1 and the protective layer 3, and the back face layer 5 which is optionally provided on the other surface of the substrate 1. The material for the substrate 1 is not particularly limited, however, it is desirable to be able to resist a heat which is added upon the transfer of the protective layer 3 onto a transfer receiving article, and to have a sufficient mechanical strength for handling without a hitch. As such a material for the substrate 1, various plastic films or sheets, for instance, including, plyesters such as polyethylene terephthalate, polyarylates, polycarbonates, polyurethanes, polyimides, polyether imides, cellulose derivatives, polyethylenes, ethylene-vinyl acetate copolymers, polypropylenes, polystyrenes, polyacrylic resins, polyvinyl chlorides, polyvinylidene chlorides, polyvinyl alcohols, polyvinyl butyrals, nylons, polyether ether ketones, polysulfones, polyether sulfones, tetrafluoroethylene-perfluoroalkyl vinyl ethers, polyvinyl fluorides, tetrafluoroethylene-ethylenes, tetrafluoroethylene-hexafluoropropylenes, polychlorotrifluoroethylenes, polyvinylidene fluorides, and the likes, may be enumerated.

Although the thickness of the substrate 1 can be appropriately selected depending on the kind of the material used so as to make it suitable in strength and heat resistance, the thickness is usually in the range of about 2.5 μm-about 100 μm.

(Protective Layer)

On one surface of the substrate 1, the protective layer 3 is provided so as to be able to be peeled from the substrate 1. The protective layer 3 is an essential component of the protective layer transfer sheet 10 according to the first embodiment of the present invention, and it is the layer which should be peeled from the substrate sheet 1 to be transferred to a transfer receiving article at the time of the thermal transfer.

With respect to the protective layer transfer sheet of the first embodiment of the present invention, the protective layer 3 which is peelably provided on the substrate 1 satisfies the following conditions (1) and (2).

Condition 1: The protective layer 3 comprises an epoxy-cured resin in which a reactive resin having a functional group capable of reacting with an epoxy group is reacted with and cured by an epoxy curing agent.

Condition 2: The glass transition temperature (Tg) of the above mentioned reactive resin is not less than 60° C.

The above mentioned condition 1 mainly has the purpose of improving durability of the protective layer 3. By including the epoxy-cured resin, in which a reactive resin having a functional group capable of reacting with an epoxy group is reacted with and cured by an epoxy curing agent, into the protective layer 3, to impart durability to the protective layer 3 is accomplished.

In the above condition 1, with the progress of curing by the epoxy curing agent, the protective layer containing the epoxy curing resin tends to become brittle. When the degree of curing is heightened in order to sufficiently improve the durability, the foil tearing property of the protective layer becomes lower as being contradictory to the improvement of durability. Further, depending on the glass transition temperature (Tg) of the reactive resin which reacts with the epoxy curing agent, it may become impossible to sufficiently satisfy the durability of the protective layer which contains the epoxy curing resin.

Therefore, in the protective layer transfer sheet of the first embodiment of the present invention, as shown in the condition 2, in order to satisfy the foil tearing property without reducing the durability imparted by curing the reactive resin with the epoxy curing agent, the glass transition temperature (Tg) of the reactive resin that reacts with the epoxy groups is defined as being not less than 60° C. In the case that an epoxy-cured resin in which a reactive resin the glass transition temperature (Tg) of which is not less than 60° C. is reacted with and cured by an epoxy curing agent is contained in the protective layer, even when the curing between the epoxy curing agent and the reactive resin is sufficiently progressed in order to sufficiently improve the durability, it is possible to satisfy the foil tearing property of the protective layer. On the other hand, in the case that an epoxy-cured resin in which a reactive resin the glass transition temperature (Tg) of which is less than 60° C. is reacted with and cured by an epoxy curing agent is contained in the protective layer, the protective layer becomes brittle and the foil tearing property becomes lower. In addition, as compared with the case that the reactive resin the glass transition temperature (Tg) of which is not less than 60° C. is used, the durability also becomes lower.

In other words, according to the protective layer 3 which contains an epoxy-cured resin that satisfies the conditions 1 and 2, it is possible to simultaneously satisfy both the requirements, i.e., the durability and the foil tearing property, which are in a trade-off relationship. Incidentally, the words "glass transition temperature" used herein denotes a temperature of degree Celsius (° C.) that is converted from a temperature (degree Kelvin) obtained by calculating in accordance with the Fox theoretical equation.

Hereinafter, the epoxy curing agent, and the reactive resin the glass transition temperature (Tg) of which is not less than 60° C. will be described.

<Epoxy Curing Agent>

The epoxy curing agent as referred to herein means a "curing agent having at least two epoxy groups in one molecule". Further, the epoxy-cured resin as referred to herein means a "resin which is obtained by reacting and curing a reactive resin with the epoxy curing agent, wherein the reactive resin has a functional group that is reactive with an epoxy group". There is no particular limitation for the epoxy curing agent, for example, bisphenol type epoxy resins such as bisphenol A type epoxy resins, bisphenol F type epoxy resins; cresol novolak type epoxy resins; phenol novolak type epoxy resins; aliphatic cyclic type epoxy resins; glycidyl ester type epoxy resins; glycidyl amine type epoxy resin; heterocyclic epoxy resins, etc., can be mentioned.

<Reactive Resin>

The reactive resin, as described above, is a resin which satisfies the condition that the glass transition temperature (Tg) thereof is not less than 60° C., and has a functional group reactive with the epoxy group of the epoxy curing agent. There is no particular limitation for the functional group of the reactive resin, as long as it can react with the epoxy groups of the epoxy curing agent. With respect to the protective layer transfer sheet according to the first embodiment of the present invention, the protective layer 3 contains an epoxy-cured resin in which a reactive resin that satisfies the above condition 2 is cured by the above epoxy curing agent.

By currying out FT-IR analysis of the resin structure after reaction of the epoxy curing agent and the epoxy reactive resin, for instance, determining the presence or absence of absorption of the epoxy group—amino group, the epoxy group—hydroxyl group, etc., and/or absorption of remaining epoxy group after reaction, it is possible to determine whether the cured resin contained in the protective layer 3 is an epoxy-cured resin which is obtained by the curing reaction of the epoxy curing agent and the reactive resin. In addition, by using an analytical instrument such as NMR and GPC, it is possible to analyze the cured product in more detail.

As the functional group capable of reacting with an epoxy group, for example, an amino group, an isocyanate group, a carboxyl group, a phenolic hydroxyl group, a hydroxyl group, an acid anhydride, a thiol group and an amide group, and the like can be exemplified.

As concrete examples, for instance, amino-modified acrylic resin, hydroxyl group-containing resin, carboxyl group-containing resin, each of which satisfies the condition that the glass transition temperature (Tg) thereof is not less than 60° C., can be exemplified. Among them, the amino-modified acrylic resin having a glass transition temperature (Tg) of not less than 60° C. is cured by the epoxy curing agent is preferable as the reactive resin, because the epoxy-cured resin in which the amino-modified acrylic resin is cured by the epoxy curing agent is extremely superior in the durability and the foil tearing property.

There is no particular limitation on the molecular weight of the reactive resin. However, when the weight average molecular weight (Mw) of the reactive resin is less than 15000, there is a tendency that the durability of the protective layer 3 becomes lower. On the other hand, when the weight-average molecular weight (Mw) of the reactive resin exceeds 70,000, there is a tendency that the foil tearing property on the transfer of the protective layer 3 is deteriorated. In consideration of this point, it is preferable that the protective layer 3 contains a cured epoxy resin in which a reactive resin having a glass transition temperature (Tg) of not less than 60° C. and a weight-average molecular weight (Mw) of not less than 15,000 and not more than 70,000 is cured by an epoxy curing agent. It is noted, however, that this is not intended to limit the molecular weight of the reactive resin, and, even if a reactive resin having a molecular weight outside the above preferred ranges is used, the durability and the foil tearing property which are imparted to the protective layer 3 become better, as compared with those obtained when a reactive resin having a glass transition temperature (Tg) of not more than 60° C. is contained in the protective layer. Incidentally, the weight average molecular weight (Mw) used herein denotes a value measured by the gel permeation chromatography (GPC) and calibrated with polystyrene standard.

In the protective layer transfer sheet of the first embodiment of the present invention, it is possible to satisfy the foil tearing property, even when the curing is sufficiently proceeded, because the reactive resin to be cured by the epoxy curing agent in the first embodiment of the present invention is the one that has a glass transition temperature (Tg) of not more than 60° C. Here, depending on the kind of the functional group owned by the reactive resin, there are some cases where the foil tearing property may decrease slightly with the progress of the reaction. Thus, it is preferable to adjust appropriately the degree of the curing depending on the kind of the reactive resin to be used.

With respect to the molar equivalent ratio of the epoxy group owned by the epoxy curing agent to the functional group owned by the reactive resin (hereinafter, the functional group is sometimes referred to as "functional group A".), there is no particular limitation. When the molar equivalent ratio (–epoxy group/–A) exceeds 3.0, however, there is a tendency that the foil tearing property of the protective layer 3 which contains the cured resin becomes lower as the increment of the molar equivalent ratio. Meanwhile, when the molar equivalent ratio (–epoxy group/–A) is less than 1.0, there is a tendency that the durability of the protective layer 3 which contains the cured resin becomes lower. In consideration of this point, it is preferable that the protective layer 3 contains the cured resin which is cured with the molar equivalent ratio of the epoxy group owned by the epoxy curing agent to the functional group owned by the reactive resin, (–epoxy group/–A), being in the range of not less than 1.0 and not more than 3.0, more desirably, not less than 1.0 and not more than 2.0. In particular, in the case that the reactive resin to be used is the amino-modified acrylic resins as exemplified above, by curing the amino-modified acrylic resins with the epoxy curing agent so that the equivalent ratio falls within this range, it is possible to obtain a protective layer 3 which predominantly excels in the durability and the foil tearing property.

With respect to the content of the epoxy-cured resin on the basis of the total solid content of the protective layer 3, there is no particular limitation, and it may be varied appropriately in accordance with the content of other optional component(s), or the like. Incidentally, when the content of the epoxy-cured resin is less than 50% by weight, on the basis of the total solid content of the protective layer 3, there may be some cases where the durability cannot be sufficiently enhanced, and further, depending on the kind of other optionally added component(s), there may be some cases where the foil tearing property is reduced. In consideration of this point, it is preferable that the epoxy-cured resin is contained in a ratio of not less than 50% by weight, on the basis of the total solid content of the protective layer 3. Here, there is no particular limitation on the upper limit of the content, and it is 100% by weight.

(Other Optional Components)

The protective layer 3 may contain other optional ingredients in addition to the epoxy-cured resin. For example, in the embodiment shown in FIG. 1, release property from the substrate 1, and adhesiveness to the transfer receiving article is required on the protective layer 3. Thus, in this embodiment, it is preferable that the protective layer 3 contains a component having release property and a component having adhesive property. Further, in the embodiment shown in FIG. 1, when transferring the protective layer 3 by using the protective layer transfer sheet 10, the protective layer 3 is located on the outermost surface of the transfer receiving article. Thus, it is preferable that the protective layer 3 contains a component having abrasion resistance (it is also referred to as slipping property.). Here, it is also possible to take corresponding measures on the transfer receiving article's side so as to satisfy the adhesive property to the protective layer 3, for example, to provide an adhesive layer on the transfer receiving article. In such a case, it is not always necessary to include the component having abrasion resistance in the protective layer 3. Furthermore, as described later, the roles that are required for the protective layer 3 in the embodiment shown in FIG. 1, can also be supplemented by additional layer(s) as shown in FIG. 2. For example, when a peeling layer 2, which can meet the demand for the release property and the abrasion resistance, is provided between the substrate 1 and the protective layer 3, and also an adhesive layer 4, which can meet the demand for the adhesiveness to the transfer receiving article, is provided on the protective layer 3, it is not always necessary to include the component having release property from the substrate, the component having adhesive property to the transfer receiving article, and the component having abrasion property in the protective layer 3.

Also, instead of the configuration shown in FIG. 1, it is possible to provide the adhesive layer 4 on the protective layer 3 and to include the component having release property and the component having abrasion property in the protective layer 3. In such a case, without including the component having an adhesive property in the protective layer 3, it is possible to satisfactorily transfer the protective layer 3 onto the transfer receiving material. Further, instead of the configurations shown in FIG. 1 and FIG. 2, it is possible to provide the peeling layer 2 between the substrate 1 and the protective layer 3, and to include the component having adhesive property in the protective layer 3. In such a case, without including the component having release property and the component having abrasion property in the protective layer 3, it is possible to impart the durability and the abrasion property to the printed article on which the protective layer has been transferred.

Here, it is necessary for the other optional component(s) to be contained within a range not to impair the foil tearing property and the durability, which are brought by the epoxy-cured resin. Concretely, it is preferable that the content of the other optional component(s) is in the range of not more than 50% by weight, on the basis of the total solid content of the protective layer 3. The following, it will be explained about the optional components.

"Component Having Abrasion Resistance"

As the component having abrasion resistance, for example, methacrylic acid ester copolymers, vinyl chloride—vinyl acetate copolymers, polyester resins, polycarbonate resins, acrylic resins, ultraviolet absorbing resins, epoxy resins, polystyrene resins, polyurethane resins, acrylic urethane resins, and silicone-modified forms of these resins, mixtures of any combination of these resins, ionizing radiation-curable resins, ultraviolet absorbing resins, and the like may be enumerated. Among them, the ultraviolet absorbing resin may be suitably used in terms of particularly excellent in abrasion resistance.

As the ultraviolet ray absorbing resin, for instance, a resin which is prepared by reacting and linking a reactive ultraviolet ray absorbing agent to a thermoplastic resin or the ionizing radiation—curable resin mentioned above can be used. More concretely, those which prepared by introducing a reactive group such as an addition-polymerizable double bond (for instance, vinyl group, acryloyl group, methacryloyl group, etc.), alcoholic hydroxyl group, amino group, carboxyl group, epoxy group, isocyanate group, etc., into a non-reactive organic ultraviolet absorbing agent known in the art such as salicylate series, benzophenon series, benzotriazole series, substituted acrylonitrile series, nikkel-chelate series, hindered amine series, etc., can be exemplified.

"Component Having Release Property from the Substrate"

As the component which is excellent in release property from the substrate 1, for example, waxes such as polyethylene waxes and silicone waxes, silicone resins, silicone modified resins, fluorine-contained resins, fluorine-modified resins, polyvinyl alcohol, acrylic resins, thermally crosslinkable epoxy—amino resins and thermally-crosslinkable alkyd—amino resins, etc., can be exemplified.

"Component Having Adhesiveness to the Transfer Receiving Article"

As the component having adhesiveness to the transfer receiving article, for example, any conventionally known adhesive agents such as those having as the main ingredient one or more of acrylic resins, vinyl resins, polyester resins, urethane resins, polyamide resins, epoxy resins, rubber resins, ionomer resins, etc., can be used broadly.

The protective layer 3 may contain a filler as an optional component. By including a filler in the protective layer 3, it becomes possible to improve the shear resistance of the protective layer 3, and this improvement in the shear resistance can bring a further improvement of the foil tearing property. As the filler, organic filler, inorganic filler, organic—inorganic hybrid type filler may be exemplified. The filler may be in a powder form or a sol form. As the powdery organic filler, for example, acrylic particles such as non-crosslinked acrylic particles and crosslinked acrylic particles, polyamide particles, fluorine-contained resin particles, polyethylene wax particles, etc., can be exemplified. As the powdery inorganic filler, for example, calcium carbonate particles, metal oxide particles such as silica particles and titanium oxide particles can be exemplified. As the organic—inorganic hybrid filler, for example, silica sol type, and organo sol type can be exemplified. These fillers may be used singly, or may be used in any combination of two or more of these fillers. Although there is no particular limitation on the content of the filler, it is preferable that the content of the filler is not more than 50% by weight, on the basis of total solid content of the protective layer 3.

"Other Optional Ingredients"

Further, the protective layer 3 may also contain other optional components, in addition to the optional components as exemplified above. As the other optional components, for example, known ultraviolet absorbents such as benzophenone-based, benzotriazole-based, benzoate-based, triazine-based, titanium oxide, zinc oxide, etc.; light stabilizers such as hindered amine-type, Ni chelate-type, etc.; antioxidants such as sulfur type, phosphorus type, lactone type; can be enumerated. These optional components may be used alone, or may be used in combination of two or more.

Further, for the purpose of further improving the abrasion resistance of the protective layer 3, the protective layer 3 may contain a lubricant. As the lubricant, for example, silicones such as modified silicone oil, silicone-modified resin; metal soaps such as zinc stearate, zinc stearyl phosphate, calcium stearate, magnesium stearate; fatty acid amides; polyethylene waxes, carnauba waxes, paraffins and the like can be exemplified.

There is no particular limitation on the method for forming the protective layer 3, and for instance, the protective layer 3 can be formed by preparing a coating liquid for the protective layer where the epoxy curing agent, the reactive resin the glass transition temperature (Tg) of which is not less than 60° C., and optionally, any component as necessary, are dispersed or dissolved in an appropriate solvent, coating thus prepared coating liquid for protective layer on the substrate 1, or on a layer which has been optionally provided on the substrate 1, in accordance with a known coating procedure such as the gravure printing method, the screen printing method, the reverse roll coating printing method using a gravure plate, or the like, and then drying the coated solution. There is no particular limitation about the thickness of the protective layer 3, and the thickness can be appropriately set within the range capable of imparting sufficient durability due to the epoxy-cured resin and bringing the foil tearing property and so on into good conditions. It is preferable that the thickness of the protective layer 3 is in the range of not less than 0.5 μm and not more than 10 μm.

In the above explanation, with respect to the protective layer transfer sheet of the construction shown in FIG. 1, the structure where the release property from the substrate 1 and the adhesive property to the transfer receiving articles are given to the protective layer 3 has been mainly described. As shown in FIG. 2, however, it may be configured to grant these roles to separate the layers. That is, in the protective layer transfer sheet of the first embodiment of the present invention, it is possible to take a single layer configuration where only the protective layer is transferred as a transfer layer onto the transfer receiving article as shown in FIG. 1, or alternatively, it is also possible to take a multi-layered configuration where any layers as well as the protective layer 3 is transferred as the transfer layer onto the transfer receiving article as shown in FIG. 2. Herein, the transfer layer means layer(s) to be transferred onto the transfer receiving article. With respect to the protective layer transfer sheet of the first embodiment of the present invention, the transfer layer contains as an essential layer the protective layer 3. FIG. 2 is a schematic sectional view showing another example of the protective layer transfer sheet where the peeling layer 2 is provided between the substrate 1 and the protective layer 3, and the adhesive layer 4 is provided on the protective layer 3. Then, the respective optional layers will be described.

(Peeling Layer)

As shown in FIG. 2, it is possible to provide a peeling layer 2 between the substrate 1 and the protective layer 3. As component(s) which constitutes the peeling layer 2, the materials exemplified above as the "component having abrasion resistance", and the "component having release property from the substrate" may be used by selecting appropriately. It should be noted that the peeling layer 2 is usually a layer to be transferred onto the transfer receiving article, together with the usual protective layer 3, it may be designed as a layer that remains on the substrate 1 side. When the peeling layer 2 is transferred to a transfer receiving article side, since the peeling layer comes to be located on the outermost surface after the transfer, it is preferable that the peeling layer contains the "component having abrasion resistance". On the other hand, when the peeling layer 2 remains on the substrate 1 side, since the protective layer 3 comes to be located on the outermost surface after transfer, it is preferable that the protective layer 3 contains the "component having abrasion resistance" as described above. In the case that the peeling layer 2 is transferred together with the protective layer 3 onto the to the transfer receiving article, when the peeling layer 2 contains the lubricant such as exemplified above, a further improvement in the abrasion resistance can be expected.

As a method of forming the peeling layer 2, for instance, the peeling layer 2 can be formed by preparing a coating liquid for the peeling layer where the above mentioned "component having abrasion resistance", the above mentioned "component having release property from the substrate" are dispersed or dissolved in an appropriate solvent, coating thus prepared coating liquid for peeling layer on the substrate 1, in accordance with a known coating procedure such as the gravure printing method, the screen printing method, the reverse roll coating printing method using a gravure plate, or the like, and then drying the coated solution. In general, the thickness of the peeling layer 2 may be in the range of 0.5 μm-5 μm.

(Plasticizer Resistive Layer)

In order to improve the plasticizer resistance of the printed article to which the protective layer 3 was transferred, a plasticizer resistive layer (not shown) may be provided between the substratel and the protective layer 3, and in the case that the peeling layer 5 is provided, it may be provided between the peeling layer 2 and the protective layer 4.

As the plasticizer resistive layer, a substance which repels the plasticizer component, or a substance which gives the plasticizer component difficulties in reaching the printed image, can be preferably used. As the above-mentioned substance which repels the plasticizer component, for instance, polyvinyl alcohol resin, polyvinyl butyral resin, polyvinyl acetal resin, polyvinyl pyrrolidone resin, etc., can be enumerated. As the substance which gives the plasticizer component difficulties in reaching the printed image, cationic resins such as cationic urethane emulsion, etc., can be enumerated. These substances may be used solely on an individual basis, or may be used as a mixture of two or more of them in combination.

In addition, with respect to polyvinyl alcohol resin, polyvinyl butyral resin, and polyvinyl acetal resin, which has been exemplified as the substance which repels the plasticizer component, it is preferable to have a saponification degree in the range of 30-100%, and more desirably, to have a saponification degree in the range of 60-100%. When the polyvinyl alcohol resin, polyvinyl butyral resin, or polyvinyl acetal resin, which has a saponification degree in the above-mentioned range, is contained in the plasticizer resistive layer, it can be expected to improve further the plasticizer resistance of the transfer layer which includes the protective layer 3. Herein, the "saponification degree" used in the present invention refers to the value obtained by dividing the number of moles of vinyl alcohol structures in the polymer by the number of moles of all monomers in the polymer. Further, it is preferable that the substance which repels the plasticizer component, or the substance which gives the plasticizer component difficulties in reaching the printed image is contained in the plasticizer resistive layer so that the weight of the substance is in the range of 20-100% by weight on the basis of the total weight of the plasticizer resistive layer.

Further, if necessary, it is possible to add to the plasticizer resistive layer, any additives, for example, lubricants, plasticizers, fillers, antistatic agents, anti-blocking agents, cross-linking agents, antioxidants, UV absorbers, light stabilizers, colorants such as dyes and pigments, fluorescent whitening agents, etc.

As the method for forming the plasticizer resistive layer which is optionally provided if necessary, such a procedure in which one or more members of the substances exemplified as above, and optionally, any various material which are added if necessary, are dissolved or dispersed in an appropriate solvent in order to prepare a coating liquid for plasticizer resistive layer, and the coating liquid thus prepared is coated on the substrate sheet 1, or on the peeling layer 2 which is optionally provided if necessary, and then the coated film is dried, may be applicable. Although there is no particular limitation on the thickness of the plasticizer resistive layer, the plasticizer resistive layer is usually about 0.1 μm-50 μm in thickness after drying, and preferably, about 1 μm-20 μm in thickness after drying.

(Adhesive Layer)

Further, as shown in FIG. 2, it is possible to provide an adhesive layer 4 on the protective layer 3. As a component of the adhesive layer 4, it can be used by selecting the components exemplified in the above mentioned "component having adhesiveness to the transfer receiving article" and the like as appropriate. Incidentally, if a certain measure to satisfy the adhesion to the protective layer 3 is taken on the transfer receiving article's side, the adhesive layer 4 is not necessarily provided on the protective layer 3.

As the method of forming the adhesive layer 4, for instance, the adhesive layer 4 can be formed by preparing a coating liquid for the adhesive layer where the above mentioned "component having adhesive property to the transfer receiving article" is dispersed or dissolved in an appropriate solvent, coating thus prepared coating liquid for adhesive layer on the protective layer 3, in accordance with a known coating procedure such as the gravure printing method, the screen printing method, the reverse roll coating printing method using a gravure plate, or the like, and then drying the coated solution. In general, the thickness of the adhesive layer 4 may be in the range of 0.5 μm-10 μm.

In the above explanation, as an example of the transfer layer having the multi-layered structure, the structure where the transfer layer includes a peeling layer, a plasticizer resistance layer and an adhesive layer, which are optional layers, in addition to the protective layer 3 as the essential layer has been described. Depending on the kinds of the components contained in the optional layers which constitute the transfer layer, for example, depending on the kinds of the components contained in the peeling layer, the plasticizer resistance layer and the adhesive layer, there are some cases that the foil tearing property for each individual optional layer, per se, becomes insufficient. In the protective layer transfer sheet according to the first embodiment of the present invention, even in the case that the transfer layer takes the multi-layered structure, and even if the foil tearing property of each individual optional layer which is transferred with the protective layer is low, since the protective layer 3 which is included in the transfer layer and which is an essential layer to be transferred to the transfer receiving article excels in the foil tearing property as described above, it is possible to improve the foil tearing property for the whole of the transfer layer including the protective layer 3 and the optional layers.

(Back Face Layer)

As shown in FIG. 2, a back face layer 5 may be provided on a surface of the substrate 1 which is different from another surface on which the protective layer 3 is provided, in order to improve the heat resistance, and to give driving stability to a thermal head on printing. Incidentally, the back face layer 5 is an optional component in the protective layer transfer sheet 10 according to the first embodiment of the present invention.

The back face layer 5 can be formed by selecting any conventionally known thermoplastic resin as appropriate. As such a thermoplastic resin, for instance, polyester type resins, polyacrylic ester type resins, polyvinyl acetate type resins, styrene acrylate type resins, polyurethane type resins, polyolefin type resins such as polyethylene type resins and polypropylene type resins, polystyrene type resins, polyvinyl chloride type resins, polyether type resins, polyamide type resins, polyimide type resins, polyamide-imide type resins, polycarbonate type resins, polyacrylamide type resins, polyvinyl chloride resins, polyvinyl butyral resins, and polyvinyl acetal resins, and silicone-modified forms of these thermoplastic resins may be enumerated. Among them, from the viewpoint of heat resistance, polyamide-imide resin and its silicone-modified form, or the like is desirable.

Furthermore, the back face layer 5 may preferably contain various additives, such as, a releasing agent such as waxes, higher fatty acid amides, phosphoric acid ester compounds, metal soaps, silicone oils, surfactants, etc., an organic powder such as fluorine-contained resin powders, and/or an inorganic compounds such as silica, clay, talc, calcium carbonate, etc, in addition to the thermoplastic resin, for the purpose of improving the slipping property. Particularly, it is preferable to include at least one of phosphoric acid ester compounds and metal soaps.

The back face layer 5 can be formed by preparing a coating liquid for the back face layer where one or more of the thermoplastic resin as mentioned above, and optionally, any additives as necessary, are dispersed or dissolved in an appropriate solvent, coating thus prepared coating liquid on the substrate 1 in accordance with a known coating procedure such as the gravure printing method, the screen printing method, the reverse roll coating printing method using a gravure plate, or the like, and then drying the coated solution. From the viewpoint of improvement of heat resistance and so on, it is preferable that the thickness of the back face layer 5 is about 0.1 $g/m^2$-about 5 $g/m^2$, and, more desirably, about 0.3 $g/m^2$-about 2.0 $g/m^2$ As described above, the protective layer transfer sheet 10 according to the first embodiment of the present invention is fairly explained. However, without deviating from the scope and the spirit of the present invention, various embodiments other than the ones as disclosed above can be taken in the present invention. For example, the protective layer transfer sheet according to the present invention can be also constructed as a dye layers' integral type protective layer transfer sheet (not shown), wherein dye layers are provided on the same surface of the substrate 1 as the protective layer 3 is provided on, so as to the dye layers are layered in parallel on the substrate across the surface of the substrate, as being frame sequentially. Incidentally, the dye layers may be a single kind of dye layer, or may take a construction, where a yellow dye layer, a magenta dye layer, a cyan dye layer are provided in this order as being frame sequentially.

<<Intermediate Transfer Medium of the First Embodiment>>

Next, the intermediate transfer medium 100 according to the first embodiment of the present invention will be described below in detail with reference to FIG. 3 and FIG. 4. The intermediate transfer medium 100 according to the first embodiment of the present invention comprises a layered structure wherein a protective layer 3 which is peelable from a substrate 1, and a receiving layer 50 are layered on a surface of the substrate 1. The substrate 1, the protective layer 3 and receiving layer 50 are essential components of the intermediate transfer medium 100 according to the first embodiment of the present invention. Incidentally, as shown in FIG. 4, the intermediate transfer medium 100 according to the first embodiment of the present invention may be provided with a peeling layer 2 which is located between the substrate 1 and the protective layer 3, and/or a back face layer which is located on another surface of the substrate 1. Further, it may be provided with an adhesive layer (not shown) which located on the receiving layer 50. Hereinafter, the components constituting the intermediate transfer medium 100 according to the first embodiment of the present invention will be described in detail.

(Substrate)

As the substrate 1, it is possible to use the same substrate 1 as described above in the explanation for the protective layer transfer sheet 10 of the first embodiment of the present invention, and thus, a detailed description thereof will be omitted here.

(Protective Layer)

On one surface of the substrate 1, the protective layer 3 is provided so as to be able to be peeled from the substrate 1. In the intermediate transfer medium 100 of the first embodiment of the present invention, the protective layer 3 comprises an epoxy-cured resin-in which a reactive resin having a functional group capable of reacting with an epoxy group is reacted with and cured by an epoxy curing agent. According to the intermediate transfer medium 100 of the first embodiment of the present invention which has this feature, after forming a thermal transfer image on the receiving layer 50, by transferring the receiving layer 50, and the protective layer 3, of the intermediate transfer medium 100 in the first embodiment of the present invention, onto any transfer receiving article, it is possible to obtain a printed article where a high durability is imparted on the thermal transfer image formed on the receiving layer 50. In addition, with respect to the intermediate transfer medium according to the first embodiment of the present invention, it is also superior in the foil tearing property of the protective layer 3 when transferring the receiving layer 50 and the protective layer onto the transfer receiving article.

The above effect provided by the intermediate transfer medium 100 in the first embodiment of the present invention is due to the same reason as the protective layer 3 in the protective layer transfer sheet 10 of the first embodiment of the present invention, and thus, a detailed description about this effect will be omitted here. Therefore, in the intermediate transfer medium 100 in the first embodiment of the present invention, it is possible to use the protective layer 3 described in the above mentioned protective layer transfer sheet 10 of the first embodiment of the present invention as it is. Incidentally, in the intermediate transfer medium of the first embodiment of the present invention, since the receiving layer 50 provided on the protective layer 3, will be superposed on the transfer receiving article directly, or indirectly via an optional layer such as the adhesive layer 4 or the like, it is not necessary that the protective layer 3 has an adhesive property.

Figure 3:
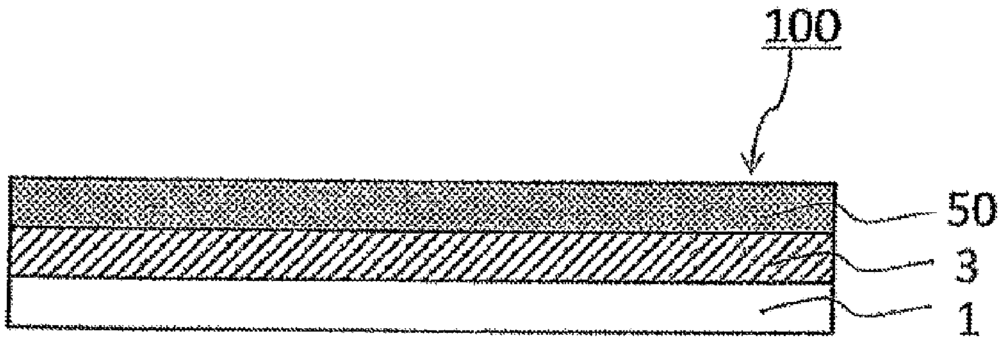
FIG. 3 is a schematic sectional view showing an example of the intermediate transfer medium according to the present invention.
Figure 4:
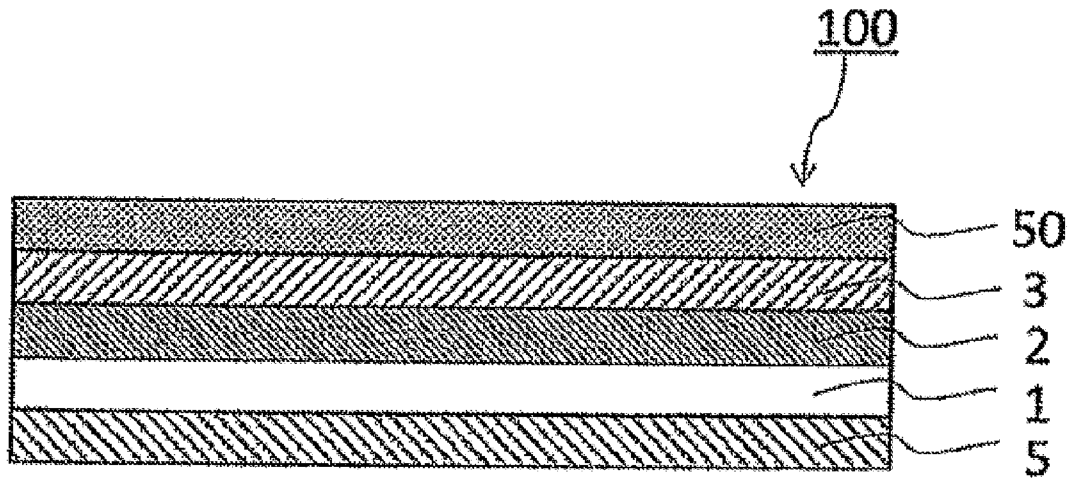
FIG. 4 is a schematic sectional view showing another example of the intermediate transfer medium according to the present invention.

Further, with respect to the intermediate transfer medium of the first embodiment of the present invention, it is possible that the protective layer 3 contains the "component having release property from the substrate" so as to become a protective layer 3 which combines with the function as a peeling layer (peeling layer—cum—protective layer), as shown in FIG. 3. Alternatively, it is also possible that the release property form the substrate is secured by providing a separate layer, for instance, by providing a peeling layer 2 between the substrate 1 and the protective layer 3, as shown in FIG. 4. As for the peeling layer 2, it is possible to use the peeling layer 2 described in the above mentioned protective layer transfer sheet 10 of the first embodiment of the present invention as it is, and thus, a detailed description thereof will be omitted here.

(Receiving Layer)

As shown in FIG. 3 and FIG. 4, on the protective layer 3, a receiving layer 50 is provided. On the receiving layer, an image will be formed. Then, the receiving layer 50, on which the image have been thus formed, is transferred in conjunction with the protective layer 3 onto a transfer receiving article. As a result, a printed article is produced. Therefore, as a material for forming the receiving layer 50, it is possible to adopt any resin material which is known as the one that can easily receive thermally-transferable colorants such as subliming dyes or thermally-fusible inks. For example, polyolefin resins such as polypropylene; halogenated resins such as polyvinyl chloride and polyvinylidene chloride; vinyl resins such as polyvinyl acetate, vinyl chloride—vinyl acetate copolymer, ethylene—vinyl acetate copolymer and polyacrylic ester; polyester resins such as polyethylene terephthalate and polybutylene terephthalate; polystyrene resins; polyamide resins; copolymer type resins of an olefin such as ethylene or propylene and another vinyl polymer; ionomer or cellulose-based resins such as cellulose diastase; polycarbonate; etc., are exemplified. In particular, vinyl chloride resin, acryl—styrene resin or a polyester resin is preferred.

When the receiving layer 50 is transferred to the transfer receiving article via an adhesive layer, adhesiveness for the receiving layer 5 itself is not necessarily required. However, if the receiving layer 50 is transferred to the transfer receiving article without the adhesive layer, it is preferable that the receiving layer 50 comprises a resin material having adhesive property, such as a vinyl chloride—vinyl acetate copolymer.

The receiving layer 50 can be formed by dissolving or dispersing a material or plural materials selected from the above-mentioned materials, and optionally in combination with various additives, into an appropriate solvent such as water or an organic solvent in order to prepare a coating liquid for the receiving layer, coating thus prepared coating liquid for the receiving layer in accordance with a known procedure such as gravure printing method, screen printing method, or reverse-coating method using a gravure plate, etc., and then drying the coated film. The receiving layer 50 is usually about 1 $q/m^2$-10 $g/m^2$ in thickness in dried state.

When the receiving layer 50 does not have the adhesiveness, it is possible to provide an adhesive layer (not shown) on this receiving layer 50. The adhesive layer is an optional component in the intermediate transfer medium 100 of the first embodiment of the present invention, and when a certain measure to satisfy the adhesion is taken on the transfer receiving article's side, the adhesive layer is not necessarily provided on the receiving layer 50. As the adhesive layer which is optionally provided on the receiving layer 50, the adhesive layer 4 as described above in the explanation for the protective layer transfer sheet 10 of the first embodiment of the present invention can be used as-is. Thus, the detailed explanation thereof is omitted here.

(Back Face Layer)

Further, the back face layer 5 may be provided on the other surface of the substrate 1 as shown in FIG. 4. As the back face layer 5, it is possible to use the same back face layer 5 in the protective layer transfer sheet 10 of the first embodiment of the present invention as described above, and thus, a detailed description thereof will be omitted here.

Also in the intermediate transfer medium according to the first embodiment of the present invention, as with the protective layer transfer sheet of the first embodiment of the present invention, the peeling layer and the plasticizer resistant layer may be provided between the substrate 1 and the protective layer 3.

(Image Forming Method)

With respect to a method for forming an image onto the receiving layer 50 by using the intermediate transfer medium of the first embodiment of the present invention, there is no particular limitation, and it is possible to form it in accordance with any conventionally known thermal transfer method. Ditto for the intermediate transfer medium of the second embodiment of the present invention described later.

As the thermal transfer sheet to be used on the above mentioned image formation, it is possible to use any conventionally known thermal transfer sheet, for instance, which comprises a substrate such as polyester film, and a thermal transferable color material layer which is provided on one surface of the substrate, and a back face layer which is provided on the other surface of the substrate. Now, the thermal transfer sheet will be explained.

(Substrate of Thermal Transfer Sheet)

As the substrate of the thermal transfer sheet, it is not particularly limited, as long as it is the one which has a known certain degree of heat resistance and a known certain degree of strength, and it is possible to select one arbitrarily from materials known in the art. As such a substrate, for instance, a resin film, such as polyethylene terephthalate film, 1,4-polycyclohexylene dimethylene terephthalate film, polyethylene naphthalate film, polyphenylene sulfide film, polystyrene film, polypropylene film, polysulfone film, aramide film, polycarbonate film, polyvinyl alcohol film, cellulose derivatives such as cellophane and cellulose acetate, polyethylene film, polyvinyl chloride film, nylon film, polyimide film, ionomer film, etc.; and a paper such as condenser paper, paraffin paper, synthetic paper, etc.; nonwoven fabric; and a complex such as complex of paper or nonwoven fabric and resin, etc., can be enumerated.

Although the thickness of the substrate is not particularly limited, it is usually about 0.5-50 μm, and preferably, about 1.5-10 μm.

The substrate may undergo surface treatment in order to improve its adhesiveness to the adjacent layer. As the surface treatment, it is possible to apply any resin surface reforming technique known in the art, such as corona discharge treatment, flame treatment, ozone treatment, ultraviolet ray treatment, radiation treatment, roughening treatment, chemical agent's treatment, plasma treatment, grafting treatment, etc. These surface treatments may be applied singly or in combination of two or more kinds of them. In addition, if necessary, the one side or both sides of the substrate may be optionally provided with an under coating layer (primer layer).

(Thermal Transferable Color Material Layer)

When the thermal transfer sheet is a sublimation type thermal transfer sheet, sublimable dye-containing color material layers are formed as the thermal transferable color material layer. On the other hand, when the thermal transfer sheet is a heat-fusion type thermal transfer sheet, the color material layer comprises a heat-fusion composition which contains coloring agent, and becomes a color material layer containing heat-fusion ink. In addition, for instance, a color material layer containing a sublimable dye and another color material layer containing a heat-fusion type ink which comprises a heat-fusion type composition with a dye, may be provided on one continuous substrate as being frame sequentially.

As the sublimable dye, for instance, diarylmethane dyes; triarylmethane dyes; thiazole dyes; merocyanine dyes; pyrazolone dyes; methine dyes; indoaniline dyes; azomethine dyes such as acetophenone azomethine dyes, pyrazolo azomethine dyes, imidazol eazomethine dyes, imidazo azomethine dyes, and pyridone azomethine dyes; xanthene dyes; oxazine dyes; cyanostyrene dyes such as dicyanostyrene dyes and tricyanostyrene dyes; thiazine dyes; azine dyes; acridine dyes; benzeneazo dyes; azo dyes such as, pyridoneazo dyes, thiopheneazo dyes, isothiazoleazo dyes, pyrroleazo dyes, pyrazoleazo dyes, imidazoleazo dyes, thiadiazoleazo dyes, triazoleazo dyes, and disazo dyes; spiropyran dyes; indolinospiropyran dyes; fluoran dyes; rhodaminelactam dyes; naphthoquinone dyes; anthraquinone dyes; and quinophthalone dyes; etc., can be enumerated. More concretely, compounds which are exemplified in Japanese Patent Unexamined Publication JP HEI 7-149062 A (JP 1995-149062 A), and the like, can be enumerated. In the thermal transferable color material layer, it is preferable that the content of the sublimable dye is not less than 5% by weight and not more than 90% by weight, more preferably, not less than 10% by weight and not more than 70% by weight, on the basis of the total solid content of the thermal transferable color material layer. When the content of the sublimable dye is less than the above mentioned range, the print density may decrease in some cases, and when the content of the sublimable dye exceeds to the above mentioned ranges, the reservation property may decrease in some cases.

As the binder resin for supporting such a dye, for instance, cellulosic resins such as ethylcellulose, hydroxyethylcellulose, ethylhydroxycellose, hydroxypropylcellulose, methylcellulose, cellulose acetate, and cellulose tributyrate; vinyl resins such as polyvinylalcohol, polyvinyl acetate, polyvinylbutyral, polyvinylacetoacetal, and polyvinylpyrrolidone; acrylic resins such as poly(meth)acrylate and poly(meta) acrylamide; polyurethane resins, polyamide resins, polyester resins, and the like. Among them, cellulosic, vinyl, acrylic, urethane, and polyester resins are preferable from the points of heat resistance and dye-transfer efficiency.

The thermal transferable color material layer may contain optionally additives such as release agent, inorganic fine particles, organic fine particles, etc. Examples of such release agent include silicone oils, polyethylene waxes, phosphate esters, etc. As the silicone oils, straight silicone oils, and modified silicone oils and their hardened forms, etc., can be enumerated. The silicone oils may be reactive ones or non-reactive ones. Examples of such inorganic fine particles include carbon black, silica, molybdenum disulfide, etc. The modified silicone oils may be classified into the reactive silicone oils and the non-reactive silicone oils. As the reactive silicone oils, for instance, amino modified-, epoxy modified-, carboxy modified-, hydroxy modified-, methacryl modified-, mercapt modified-, phenol modified-, one terminal reactive-hetero functional group modified-, etc., may be enumerated. As the non-reactive silicone oils, for instance, polyether modified-, methylstyryl modified-, alkyl modified-, higher fatty acid ester modified-, hydrophilic special modified-, higher alkoxy modified-, fluorine modified-, etc., may be enumerated. As for adding amount of the silicone oil, it is preferable to be 0.1-15% by weight, and more desirably, 0.3-10% by weight, on the basis of weight of the binder. Examples of the organic fine particles as mentioned above include polyethylene waxes, etc.

The thermal transferable color material layer may be formed, for instance, by dissolving or dispersing the sublimable dye and the binder resin, and optionally, various additives if necessary, in a suitable solvent, to prepare a coating liquid for thermal transferable color material layer; coating the coating liquid on the substrate by a conventional coating method; and drying the coated liquid. As the conventional coating method, for instance, gravure printing, reverse roll coating using a gravure plate, roll coater, bar-coater, etc. may be enumerated. As the solvent, for instance, toluene, methyl ethyl ketone, ethanol, isopropyl alcohol, cyclohexanone, dimethylformamide (DMF), etc., may be enumerated.

There is no particular limitation for the thickness of the thermal transferable color material layer, and usually, the thickness may be in the range of 0.2 μm-0.5 μm.

(Back Face Layer of the Thermal Transfer Sheet)

In addition, for the purpose of improving the thermal resistance and giving the driving stability to the thermal head, a back face layer may be provided on the other surface of the substrate. As the back face layer 5, it is possible to use the same back face layer 5 in the protective layer transfer sheet 10 of the first embodiment of the present invention as described above, and thus, a detailed description thereof will be omitted here.

<<Protective Layer Transfer Sheet of the Second Embodiment>>

Figure 5:
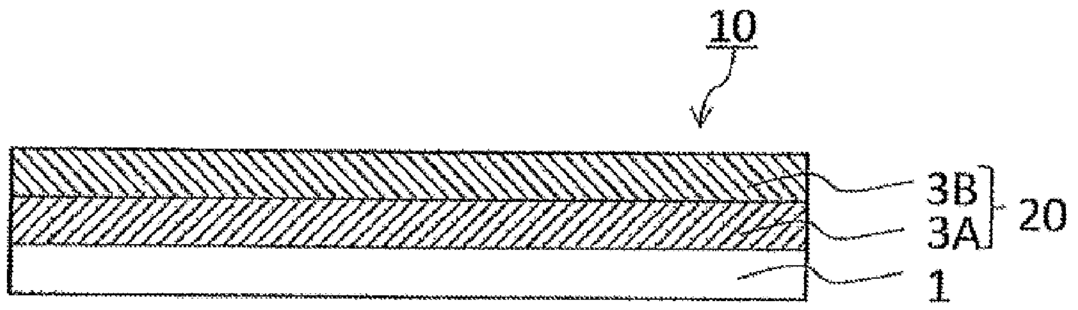
FIG. 5 is a schematic sectional view showing an example of the protective layer transfer sheet according to the present invention.
Figure 6:
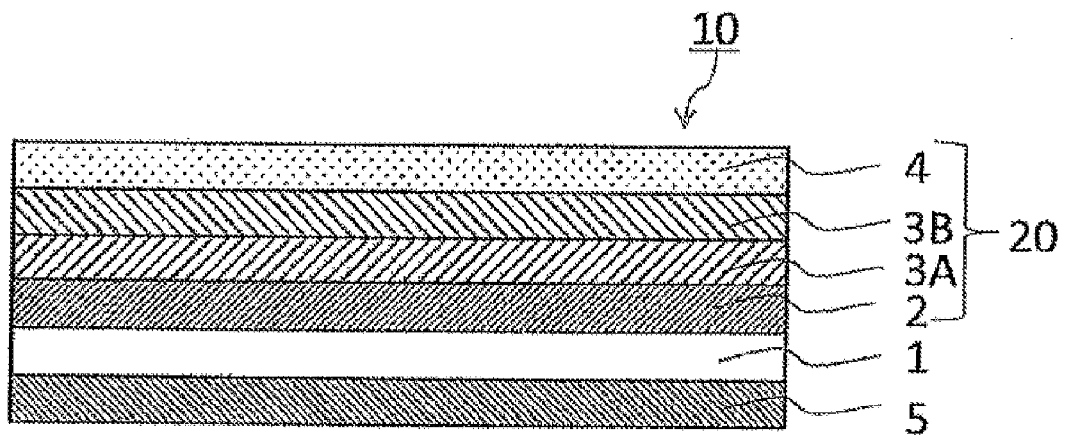
FIG. 6 is a schematic sectional view showing another example of the protective layer transfer sheet according to the present invention.

Now, the protective layer transfer sheet 10 of the second embodiment according to the present invention will be described in detail. FIG. 5 is a schematic sectional view showing an example of the protective layer transfer sheet of the second embodiment of the present invention. As shown in FIG. 5, the protective layer transfer sheet 10 of the second embodiment of the present invention comprises a substrate 1 and a transferable protective layer 20 which is peelably provided on a surface of the substrate 1, wherein the transferable protective layer 20 comprises a layered structure in which a first protective layer 3A, and a second protective layer 3B which is in contact directly with the first protective layer 3A, are provided in this order from the substrate 1 side. The protective layer transfer sheet according to the second embodiment of the present invention is not intended to be limited to the embodiment shown as above at all. For example, as shown in FIG. 6, an optional peeling layer 2 may be provided between the substrate 1 and the first protective layer 3A. Also, an optional adhesive layer 4 may be provided on the second protective layer 3B. Further, an optional back face layer 5 may be provided on the other surface of the substrate 1. Furthermore, another protective layer (not shown) which is different from the first protective layer 3A and the second protective layer 3B may be provided between the substrate 1 or the optional peeling layer 3 and the first protective layer 3A, wherein the other protective layer may be of two or more layers laminated, instead of a single layer. That is, transferable protective layer 20 comprises two or more protective layers, and, one of the two or more protective layers is the first protective layer 3A to be described in details below, and another one of the two or more protective layer is the second protective layer 3B to be described in details below, and wherein the first protective layer 3A and the second protective layer 3B should be in contact directly with each other, and the second protective layer 3B should be located at a position being farther than the first protective layer 3A from the substrate 1. Hereinafter, the components constituting the protective layer transfer sheet 10 of the second embodiment of the present invention will be described in detail. Unless otherwise specified, when referring the protective layer 3, it means the layered structure of the protective layer 3A and the second protective layer 3B.

(Substrate)

The substrate 1 is an essential component of the protective layer transfer sheet 10 according to the second embodiment of the present invention, and it is provided for the purpose of supporting the first protective layer 3A (in the case of showing in FIG. 6, the optional peeling layer 2), and the back face layer 5 which is optionally provided on the other surface of the substrate 1. The material for the substrate 1 is not particularly limited, however, it is desirable to be able to resist a heat which is added upon the transfer of the transferable protective layer 3 onto a transfer receiving article, and to have a sufficient mechanical strength for handling without a hitch. As the substrate 1, it is possible to use the same substrate 1 as described above in the explanation for the protective layer transfer sheet of the first embodiment of the present invention, and thus, a detailed description thereof will be omitted here.

(Transferable Protective Layer)

The transferable protective layer 3 is provided so as to be able to be peeled from the substrate 1, and it is the layer to be transferred onto the transfer receiving article at the time of the thermal transfer, by being peeled from the substrate 1. As shown in FIGS. 5 and 6, transferable protective layer 20 shows a layered structure in which the first protective layer 3A, and the second protective layer 3B which is in contact directly with the first protective layer 3A, are provided in this order from the substrate 1 side The first protective layer 3A and the second protective layer 3B are essential layers constituting the transferable protective layer 20. In FIG. 6, an optional peeling layer 2 is provided between the substrate 1 and the first protective layer 3A, and an optional adhesive layer 4 is provided on the second protective layer 3B. The optional peeling layer 2, and the optional adhesive layer 4 in FIG. 6 is optional layers constituting the transferable protective layer 20.

With respect to the transferable protective layer which includes the protective layers, it is required that (1) the transferable protective layer has a good foil tearing property when it is transferred onto the transfer receiving article, (2) the transferable protective layer has physical durability such as wearing resistance and abrasion resistance, and the like, and (3) the transferable protective layer has chemical durability such as plasticizer resistance and solvent resistance, and the like. However, it is difficult to satisfy the requirements of (1) and (2) simultaneously bya single layer which constitutes the transferable protective layer at the present situation. Further, focusing on one layer which constitutes the transferable protective layer and improving the foil tearing property of the layer, the foil tearing property for the whole transferable protective layer would become lower as long as the interlayer adhesiveness between the individual layers which constitutes the transferable protective layer is low. In addition, in the case that the interlayer adhesiveness between the individual layers which constitutes the transferable protective layer is low, when the surface of the transferable protective layer after transferring onto the transfer receiving article undergoes rubbing, delamination would occur at the interface between the individual layers which constitutes the transferable protective layer, and which may cause a problem that a part of layer which constitutes the transferable protective layer falls off. That is, in order to improve the foil tearing property, it is important to improve the interlayer adhesion between the individual layers constituting the transferable protective layer. Therefore, in the protective layer transfer sheet according to the second embodiment of the present invention, in order to satisfy the above mentioned requirements (1)-(3) that are required for the transferable protective layer 20, the first protective layer 3A and the second protective layer 3B, which are included in the transferable protective layer 20, have features described below.

(First Protective Layer)

In the transferable protective layer 20, the first protective layer 3A is a protective layer which has a focus that satisfy the requirement of the above (2), and comprises a cured resin in which a reactive resin having a functional group capable of reacting with a curing agent is reacted with and cured by the curing agent. Hereinafter, the cured resin in which a reactive resin having a functional group capable of reacting with a curing agent is reacted with and cured by the curing agent is simply referred to as "cured resin" occasionally. According to the transferable protective layer 20 which includes the first protective layer 3A, owing to the presence of the "cured resin" contained in the first protective layer 3A, it is possible to impart the physical durability, that is the requirement of the above (2), to the transferable protective layer 20. Further, the "cured resin" contained in the first protective layer 3A can play a role of reinforcing the chemical durability of the transferable protective layer 20, and by a synergistic effect with the second protective layer 3B described below, it is also possible to improve the chemical durability of the transferable protective layer 20.

<Reactive Resin Having a Functional Group Capable of Reacting with a Curing Agent>

With respect to the reactive resin having a functional group capable of reacting with a curing agent (hereinafter, it is simply referred to as reactive resin.), there is no particular limitation on it, and, depending on the kind of the curing agent to be used, it can be selected appropriately. As concrete examples thereof, for instance, reactive resins having an amino group, an isocyanate group, a carboxyl group, a phenolic hydroxyl group, a hydroxyl group, an acid anhydride, thiol groups, an amide group, or the like can be exemplified.

As the resin having a hydroxyl group, for instance, acrylic polyol resins, polyester polyol, polyether polyol, polycarbonate polyol, and the like can be enumerated. As the resin having a carboxyl group, acrylic resins, polyester resins and the like can be enumerated.

Particularly, when the first protective layer 3A contains a cured resin in which an acrylic polyol resin is cured by the curing agent, it is excellent in physical durability, and further the foil tearing property of the first protective layer 3A itself is also improved, as compared with other first protective layers 3A each of which contain a different cured resin in which a reactive resin other than the acrylic polyol is cured by the curing agent. With respect to the protective layer transfer sheet of the second embodiment of the present invention, by improving the interlayer adhesiveness between the first protective layer 3A and the second protective layer 3B, the improvement of the foil tearing property of the whole transferable protective layer 20 can be attained principally. By improving the foil tearing property of the first protective layer 3A itself, it is possible to further improve the foil tearing property of the whole transferable protective layer 20. In view of the above, as the reactive resin, acrylic polyol resin is preferred. In the paragraphs that follow, as a preferred embodiment of the reactive resin, the acrylic polyol resin will be mainly described.

The acrylic polyol resin means an acrylic resin having hydroxyl group(s), for instance, acrylic polyol obtained by copolymerizing one or more kinds of (meth)acrylic acid alkyl esters, such as, methyl (meth)acrylate, ethyl (meth)acrylate, butyl (meth)acrylate, 2-ethylhexyl (meth)acrylate, octyl (meth)acrylate, and one or more kinds of (meth)acrylic ester involving hydroxyl group(s) in its molecule, such as 2-hydroxyethyl (meth)acrylate, 2-hydroxybutyl (meth)acrylate, 2-hydroxy-3-phenoxypropyl (meth)acrylate, etc., and optionally, one or more kinds of other polymerizable monomers such as styrene, etc., can be enumerated. Concretely, for instance, methyl (meth)acrylate-2-hydroxyethyl (meth)acrylate copolymer, octyl (meth)acrylate-ethyl hexyl (meth)acrylate-2-hydroxyethyl (meth)acrylate copolymer, methyl (meth)acrylate-butyl (meth)acrylate-2-hydroxyethyl (meth) acrylate copolymer, and the like, can be exemplified. Here, the word "(meth)acrylate" means acrylate or methacrylate.

The acrylic polyol resin which constitutes the cured resin has preferably a glass transition temperature (Tg) of not less than 50° C. When the first protective layer 3A contains a cured resin in which the acrylic polyol resin having a glass transition temperature (Tg) of not less than 50° C. is cured by the curing agent, it becomes possible to further improve the physical durability of the first protective layer.

Herein, the glass transition temperature of the acrylic polyol resin (Tg) denotes a temperature of degree Celsius (° C.) that is converted from a temperature (degree Kelvin) obtained by calculating in accordance with the Fox theoretical equation. The glass transition temperature of other resins, for instance, the glass transition temperature of the above mentioned acrylic resin or polyester resin each having a carboxyl group, denotes a temperature calculated from measurement of a change of calorie (DSC method) in accordance with the DSC (differential scanning calorimetry).

Although there is no particular limitation on the molecular weight of the acrylic polyol resin which forms a cured resin, a first protective layer which contains a cured resin in which an acrylic polyol resin having a weight average molecular weight (Mw) of less than 8000 may show a tendency to decrease the physical durability, as compared with a first protective layer which contains a cured resin in which an acrylic polyol resin having a weight average molecular weight (Mw) of not less than 8000. Meanwhile, a first protective layer which contains a cured resin in which an acrylic polyol resin having a weight average molecular weight (Mw) of more than 70000 may show a tendency to deteriorate the foil tearing property of the first protective layer 3A, as compared with a first protective layer which contains a cured resin in which an acrylic polyol resin having a weight average molecular weight (Mw) of not more than 70000. In consideration of this viewpoint, the weight average molecular weight (Mw) of the acrylic polyol resin constituting the cured resin is preferably in the range of not less than 8,000 and not more than 70,000. The weight average molecular weight (Mw), and number average molecular weight described later (Mn) denotes values measured by the gel permeation chromatography (GPC) and calibrated with polystyrene standard.

Furthermore, the hydroxyl value of the acrylic polyol resin which constitutes the cured resin is preferably in the range of not less than 10 mg KOH/g and not more than 100 mg KOH/g. According to the first protective layer which contains a cured resin in which an acrylic polyol resin having a hydroxyl value within this range is cured by a curing agent, it become possible to improve further the foil tearing property of the first protective layer 3A and the physical durability. In the case that the first protective layer contains a cured resin in which an acrylic polyol resin having a hydroxyl value of more than 100 mg KOH/g is cured by the curing agent, there is a tendency to deteriorate the foil tearing property, as compared with the case that the first protective layer contains a cured resin in which an acrylic polyol resin having a hydroxyl value of not more than 100 mg KOH/g is cured by the curing agent. Meanwhile, in the case that the first protective layer contains a cured resin in which an acrylic polyol resin having a hydroxyl value of less than 10 mg KOH/g is cured by the curing agent, there is a tendency to deteriorate the durability, as compared with the case that the first protective layer contains a cured resin in which an acrylic polyol resin having a hydroxyl value of not less than 10 mg KOH/g is cured by the curing agent.

Herein, the term "hydroxyl value" of the acrylic polyol resin means mg of potassium hydroxide required to acetylate the hydroxyl groups contained in 1 g of the acrylic polyol resin. The hydroxyl value can be determined by preparing an acrylic polyol resin pyridine solution containing acetic anhydride, acetylating the hydroxyl groups, hydrolyzing an excess of acetylation reagent by water, and subjecting obtained acetic acid to a titration with potassium hydroxide.

<Curing Agent>

As the curing agent for obtaining the cured resin, isocyanate-based curing agents, and metal chelating agents such as titanium chelating agents, zirconium chelate agents, aluminum chelating agents, etc. are preferable. The isocyanate curing agent can cross-link molecules of a resin having a hydroxyl group or a resin having a carboxyl group by utilizing their owned hydroxyl groups or carboxyl groups. As the isocyanate curing agent, a polyisocyanate resin can be preferably used. Although various types are known in the art as the polyisocyanate resin, it is preferable to use an adduct of aromatic isocyanate. As the aromatic polyisocyanate, for instance, 2,4-toluene diisocyanate, 2,6-toluene diisocyanate, or a mixture of 2,4-toluene diisocyanate and 2,6-toluene diisocyanatehexamethylene diisocyanate, 1,5-naphtalene diisocyanate, tolidine diisocyanate, p-phenylene diisocyanate, trans-cyclohexane, 1,4-diisocyanate, xylylene diisocyanate, triphenyl methane triisocyanate, and tris(isocyanate phenyl) thiophosphate may be enumerated. Among them, 2,4-toluene diisocyanate, 2,6-toluene diisocyanate, or a mixture of 2,4-toluene diisocyanate and 2,6-toluene diisocyanate are particularly preferable.

The isocyanate-based curing agent is preferable to be one selected form the group consisting of XDI types, HMDI types and IPDI types. Using one of these isocyanate-based curing agents for curing the resin having a hydroxyl group, it is possible to prevent the first protective layer 3A from yellowing. Incidentally, when a cured resin in which the resin having a hydroxyl group is cured by an isocyanate-based curing agent other than the isocyanate-based curing agent selected from these groups, for example, TDI type, or MDI type isocyanate-based curing agent, is contained in the layer 3A, the first protective layer 3A is forced to become yellowing, and, in some cases, the appearance of the printed articles in which the transferable protective layer 20 including the first protective layer 3A has been transferred may deteriorate.

Although there is no particular limitation on the degree of the curing reaction by the reactive resin and the curing agent, with the progress degree of the curing reaction, the foil tearing property of the first protective layer 3A tends to decline, while the physical durability of the first protective layer 3A is gradually increased. Therefore, in determining the degree of the curing reaction, it is preferable to appropriately set in consideration of the foil tearing property of the first protective layer 3A. However, it should be noted that this is not intended to limit the degree of the curing reaction with the reactive resin and a curing agent. Even when it is allowed to proceed excessively the curing reaction, according to the protective transfer sheet of the second embodiment of the present invention wherein the interlayer adhesion with the second protective layer 3B described below is enhanced, it is possible to satisfy the foil tearing property of the whole transferable protective layer 20.

For example, in the case that the acrylic polyol resin is used as the reactive agent and the isocyanate-based curing agent is used as the curing agent, it is preferable that the first protective layer 3A contains a cured resin which is cured so that the molar equivalent ratio (—NCO/—OH) between the isocyanate group owned by the isocyanate type curing agent and hydroxyl group owned by the acrylic polyol resin lies within the range of not more than 3.0, preferably, not more than 2.0, and more preferably, not more than 0.5. When the first protective layer 3A is designed so as to contain a cured resin which is cured with having a molar equivalent ratio (—NCO/—OH) of not more than 3.0, it is possible to further improve the foil tearing property. Particularly, from the viewpoint that further improvements in the physical durability and the chemical durability of the transferable protective layer which includes the first protective layer 3A can be attained, in addition to the improvement in the foil tearing property, it is desirable that the first protective layer 3A contains a cured resin which is cured so that the molar equivalent ratio (—NCO/—OH) between the isocyanate group owned by the isocyanate type curing agent and hydroxyl group owned by the acrylic polyol resin lies within the range of not less than 0.2 and not more than 3.0, preferably, the range of not less than 0.2 and not more than 2.0, and more preferably, the range of not less than 0.2 and not more than 0.5.

Next, a method for determining whether a protective layer of interest satisfies the matter specifying the invention for the first protective layer 3A in the protective layer transfer sheet of the second embodiment of the present invention or not will be explained. For instance, by currying out the infrared absorption (FT-IR) analysis, it is possible to determine whether a protective layer of interest contains a cured resin or not. Concretely, by currying out the infrared absorption (FT-IR) analysis, it is possible to identify what kind of reactive resin is included in the protective layer of interest, and further, to identify whether the reactive resin contained is cured by a curing agent or not. For example, if absorption(s) of acrylic acid ester or methacrylic acid ester can be observed on the infrared absorption (FT-IR) analysis, it can be identified that the protective layer of interest contains an acrylic acid ester. If absorption(s) of urethane bond where an isocyanate group and a hydroxyl group were reacted with each other, absorption(s) of remaining unreacted isocyanate group can be observed, it can be identified that the reactive resin which is included in the protective layer of interest has been cured by a curing agent. In addition, by carrying out the infrared spectroscopy (IR) measurement to determine whether additional peak(s) which is due to the bonding to the hydroxyl group is found or not, it is possible to determine whether resinous component contained in the protective layer of interest is a cured resin or not. Moreover, by utilizing the above mentioned specific methods, it is possible to determine whether a protective layer of interest satisfies the matter specifying the invention for the protective layer 3 in the protective layer transfer sheet of the first embodiment of the present invention or not.

With respect to the content of the cured resin on the basis of the total solid content of the first protective layer 3A, there is no particular limitation, and it may be varied appropriately in accordance with the content of other optional component(s), or the like. Incidentally, when the content of the cured resin is less than 50% by weight, on the basis of the total solid content of the first protective layer 3A, there may be some cases where the physical durability or the chemical durability cannot be sufficiently satisfied, and further, depending on the kind of other optionally added component(s), there may be some cases where the foil tearing property is reduced. In consideration of this point, it is preferable that the cured resin is contained in a ratio of not less than 50% by weight, on the basis of the total solid content of the first protective layer 3A. Here, there is no particular limitation on the upper limit of the content, and it is 100% by weight.

The first protective layer 3A may contain other optional ingredients in addition to the above mentioned cured resin. For example, in the embodiment shown in FIG. 5, the first protective layer 3A is provided directly on the substrate 1. In the embodiment shown in FIG. 5, in order to allow the transferable protective layer 20 to release from the substrate 1, the release property from the substrate 1 is necessary for the first protective layer 3A. Thus, in the embodiment shown in FIG. 5, that is, in the case that the first protective layer 3A is provided directly on the substrate 1, it is preferable that the first protective layer 3 contains a component having release property. Further, in the embodiment shown in FIG. 5, the role of release property that is required for the first protective layer 3A can also be supplemented by additional layer(s). For example, as shown in FIG. 6, when a peeling layer 2, which can play a role of enabling to release the transferable protective layer 20 from the substrate 1, is provided between the substrate 1 and the first protective layer 3A, the protective layer 3A is not required to have the release property. Moreover, in order to satisfy the release property of the transferable protective layer 20 from the substrate 1, it is also possible to perform any procedure for improving the release property to the substrate 1 side.

As the component having release property, the materials exemplified above as the "component having release property from the substrate" described above in relation to the protective layer transfer sheet of the first embodiment may be used by selecting appropriately, and thus, the detailed description thereof is omitted here.

Further, in the embodiment shown in FIG. 5, when transferring the transferable protective layer 20 onto the transfer receiving article, the first protective layer 3A is located on the outermost surface of the transfer receiving article. According to the protective layer transfer sheet of the second embodiment of the present invention, since the first protective layer 3A contains the cured resin, the physical durability of the first protective layer 3A becomes good. Therefore, without adding any component other than the cured resin to the first protective layer 3A, it is possible to impart a good physical durability to a transfer receiving article on which the transferable protective layer 20 has been transferred. Incidentally, if it is intended to further improve the physical durability, particularly, the abrasion resistance, it is preferable that the first protective layer 3A of the embodiment shown in FIG. 5 contains a component which excels in the abrasion resistance.

As the component which excels in the abrasion resistance, the materials exemplified above as the "component having abrasion resistance" in relation to the protective layer transfer sheet of the first embodiment may be used by selecting appropriately, and thus, the detailed description thereof is omitted here.

Further, the first protective layer 3A may contain any of "other optional ingredients" described above in relation to the protective layer transfer sheet of the first embodiment.

Further, the first protective layer 3A may contain a filler. By including a filler in the first protective layer 3, it becomes possible to improve the shear resistance of the first protective layer 3, and this improvement in the shear resistance can bring a further improvement of the foil tearing property. As the filler, the materials exemplified above as the filler in relation to the protective layer 3 of the first embodiment may be used by selecting appropriately, and thus, the detailed description thereof is omitted here.

Although there is no particular limitation on the content of the optional component(s) other than the cured resin, it is preferable that it is contained in a range that does not interfere with a preferred content of the cured resin to the total solid content of the first protective layer 3A.

Although the first protective layer 3A has been explained with mainly referring to the cured resin in which the acrylic polyol resin is cured by the curing resin, the first protective layer 3A may contain two or more kinds of the cured resins.

There is no particular limitation on the method of forming the first protective layer 3A, and for instance, the first protective layer 3A can be formed by preparing a coating liquid for the first protective layer where the reactive resin and the curing agent, and optionally, any component as necessary, are dispersed or dissolved in an appropriate solvent, coating thus prepared coating liquid for the first protective layer on the substrate 1, or on a layer which has been optionally provided on the substrate 1, and then drying the coated solution. Although there is no particular limitation about the thickness of the first protective layer 3A, it is preferable that the thickness of the first protective layer 3A is in the range of not less than 0.5 μm and not more than 5 μm.

(Another Preferred Embodiment of the First Protective Layer)

Further, instead of the first protective layer 3A described above, it is possible to adopt a first protective layer 3A of the following embodiment (first protective layer 3A of another preferred embodiment).

The first protective layer 3A of another preferred embodiment contains an epoxy-cured resin in which a reactive resin having a functional group capable of reacting with an epoxy group and a glass transition temperature (Tg) of not less than 60° C. is reacted with and cured by an epoxy curing agent. That is, in this embodiment, the protective layer 3 as described in the protective layer transfer sheet of the aforementioned first embodiment is used as the first protective layer 3A.

According to the protective layer transfer sheet of the second embodiment which includes the first protective layer 3A of the other preferable embodiment as the first protective layer 3A which constitutes the transferable protective layer 20, it is possible to sufficiently satisfy the durability of the first protective layer 3A, particularly, the physical durability of the first protective layer 3A. Further, by improving the chemical durability with the second protective layer 3B described later, the physical durability and the chemical durability of the transferable protective layer 20 which include the first protective layer 3A of the other preferred embodiment and the second protective layer 3B become very high. Further, since the first protective layer 3A of another preferred embodiment has a good the foil tearing property and excels in the interlayer adhesiveness with the second protective layer as well, it is possible to improve the foil tearing property of the whole transferable protective layer 20, while suppressing occurrence of the problem for delamination at the interface between the first protective layer 3A and the second protective layer 3B.

As the first protective layer 3A of the another preferred embodiment, the protective layer 3 described in the protective layer transfer sheet of the first embodiment can be used as is, and thus, a detailed description thereof will be omitted here.

(Second Protective Layer)

In the above explanation, the point that the physical durability can be imparted to the transferable protective layer 20 by the first protective layer 1 has been described. When the transferable protective layer 20 contains only the abovementioned first protective layer 3A as the protective layer, however, it is not possible to sufficiently satisfy the chemical durability such as plasticizer resistance, solvent resistance, etc., although the transferable protective layer 20 possesses the physical durability. In other words, it is impossible to satisfy the requirements of the above (3).

Moreover, the cured resins which is obtained by curing the reactive resin with the curing agent does not nearly have an adhesive property, and thus, the first protective layer 3A described above comes down to showing a low adhesiveness against another layer which is directly in contact with the first protective layer 3A. In order to impart chemical durability, in addition to the physical durability, to the transferable protective layer 20, when a transferable protective layer is constituted by superposing another layer which has a focus on improving the chemical durability on the first protective layer (hereinafter, this transferable protective layer is referred to as "comparative transferable protective layer".), the first protective layer 3A is easily peeled off at the interface between the first protective layer 3A and the another protective layer, and thus, it is impossible to satisfy the physical durability of the whole transferable protective layer. Specifically, in the case that the interlayer adhesiveness between the first protective layer 3A and the another layer which constitute the comparative transferable protective layer is low, when the surface of the comparative transferable protective layer after transfer undergoes rubbing, delamination would occur at the interface between the first protective layer 3A and the another layer, and the physical durability of the whole transferable protective layer is reduced significantly. That is, when preparing this comparative transferable protective layer, even if the physical durability of the first protective layer 3A itself is adequately satisfied, it is not possible to satisfy the physical durability as the above requirement (2), in particular, the abrasion resistance, of the whole transferable protective layer.

Moreover, when preparing this comparative transferable protective layer, at the time of transferring the comparative transferable protective layer including the first protective layer 3A, it is impossible to transfer the another protective layer superposed on the first protective layer 3A so as to follow the first protective layer 3A. Thus, even if the foil tearing property of the first protective layer 3A itself is favorable, it is not possible to satisfy the foil tearing property of the whole transferable protective layer. That is, with the structure of the comparative transferable protective layer, it is not possible to satisfy the foil tearing property as the above requirement (1).

Therefore, the protective layer transfer sheet according to the second embodiment of the present invention, as shown in FIG. 5 and FIG. 6, it is characterized in that the second protective layer 3B which is in contact directly with the first protective layer 3A, and is located at a position being farther than the first protective layer 3A from the substrate 1 contains a polyester resin having a number-average molecular weight (Mn) of not less than 8000 and a glass transition temperature (Tg) of not less than 45° C. According to the transferable protective layer 20 which includes the second protective layer 3B having the above features, in addition to the first protective layer 3A, it is possible to improve the interlayer adhesiveness between the first protective layer 3A and the second protective layer 3B, and also possible to satisfy the foil tearing property of the whole transferable protective layer 20. That is, it is possible to satisfy the above requirement (1). Also, owing to this enhancement in the interlayer adhesiveness, it is possible to dissolve the delamination problem at the interface between the first protective layer 3A and the second protective layer 3B which constitute the transferable protective layer 20.

The detailed mechanisms for the aspect that the interlayer adhesiveness between the first protective layer 3A and the second protective layer 3B becomes good when taking the second protective layer 3B having the above characteristics have been not clarified well, but the first protective layer 3A contains unreacted curing agent as well as the cured resin in which the reactive resin is cured by the curing agent. Thus, it can be assumed that the unreacted curing agent contained in the first protective layer 3A is bound to the polyester resin contained in the second protective layer 3B, and thereby the interlayer adhesiveness between the first protective layer 3A and the second protective layer 3B may be enhanced. Alternatively, it can be also assumed that the unreacted curing agent contained in the first protective layer 3A, or functional groups of the reactive resin which has been reacted in parts with the curing agent, is linked via the curing agent with the functional groups of the polyester contained in the second protective layer 3B, and thereby the interlayer adhesiveness between the first protective layer 3A and the second protective layer 3B may be enhanced. Even not according to these mechanisms, when taking the construction of directly contacting the first protective layer 3A and the second protective layer 3B as described above, to improve interlayer adhesiveness, and to improve physical durability, chemical durability, foil tearing property are revealed from the results of Examples and Comparative Examples described later.

Similarly, in the first protective layer 3A of another preferred embodiment, it can be assumed that the epoxy groups of unreacted epoxy curing agent contained in the first protective layer 3A is bound to carboxyl groups of the polyester resin contained in the second protective layer 3B; or, the reactive resin contained in the first protective layer 3A of the another preferred embodiment, or functional groups of the reactive resin which has been reacted in parts with the epoxy curing agent, is linked via the epoxy curing agent with the functional groups of the polyester contained in the second protective layer 3B, and thereby the interlayer adhesiveness between the first protective layer 3A and the second protective layer 3B may be enhanced.

The polyester resin contained in the second protective layer 3B is defined as the one which has a number average molecular weight (Mn) of not less than 8000 and a glass transition temperature (Tg) of not less than 45° C. Hereinafter, the polyester resin which has a number average molecular weight (Mn) of not less than 8000 and a glass transition temperature (Tg) of not less than 45° C. is also referred to as "specific polyester resin", occasionally. According to the second protective layer 3B containing the "specific polyester resin", it is possible to impart the chemical durability on the second protective layer 3B. Thus, according to the transferable protective layer 20 containing the first protective layer 3A and the second protective layer 3B, it is possible to impart both of the physical durability and the chemical durability on the transferable protective layer 20. In addition, with respect to the protective layer transfer sheet of the second embodiment of the present invention, since the interlayer adhesiveness between the first protective layer 3A and the second protective layer 3B is excellent, it is possible to attain a satisfied level in the foil tearing property of the whole transferable protective layer 20, without deteriorating the given physical durability and the given chemical durability.

Incidentally, in the case that a polyester resin having a glass transition temperature (Tg) of less than 45° C. is added in the second protective layer, instead of the above "specific polyester resin", even if the added polyester resin has a number average molecular weight (Mn) of not less than 8000, it is not possible to satisfy the solvent resistance as one of the chemical durability. It is sufficient for the "specific polyester resin" to satisfy the condition of having a glass transition temperature (Tg) of not less than 45° C., and thus, there is no particular limitation on the upper limit thereof. In view of the foil tearing property, however, it is preferable to be not more than 80° C.

Further, in the case that a polyester resin having a number average molecular weight (Mn) of less than 8000 is added in the second protective layer, instead of the above "specific polyester resin", even if the added polyester resin has a glass transition temperature (Tg) of not less than 45° C., it is not possible to satisfy the plasticizer resistance as one of the chemical durability. It is sufficient for the "specific polyester resin" to satisfy the condition of having a number average molecular weight (Mn) of less than 8000, and thus, there is no particular limitation on the upper limit thereof. In view of the foil tearing property, however, it is preferable to be not more than 30,000. Furthermore, from the viewpoint that it is possible to further improve the physical durability of the whole transferable protective layer 20 which includes the second protective layer 3B, it is preferable that the second protective layer 3B contains a "specific polyester resin" which has a number average molecular weight (Mn) of not less than 12,000.

In the protective layer transfer sheet of the second embodiment of the present invention, the first protective layer 3A has focused on improving the physical durability, while the second protective layer 3B has focused on improving the chemical durability. The first protective layer 3A also plays an auxiliary role of enhancing further the improvement in the chemical durability by means of the second protective layer 3B. That is, when the chemical durability of the transferable protective layer 20 wherein the first protective layer 3A and the second protective layer has been layered is compared with the chemical durability of the transferable protective layer which is made of only the second protective layer 3B, the chemical durability of the former transferable protective layer 20 is superior to the chemical durability of the latter transferable protective layer by the inclusion of the first protective layer 3A.

Similarly, the second protective layer 3B plays an auxiliary role of enhancing further the improvement in the physical durability by means of the first protective layer 3A. That is, when the physical durability of the transferable protective layer 20 wherein the first protective layer 3A and the second protective layer has been layered is compared with the physical durability of the transferable protective layer which is made of only the first protective layer 3A, the physical durability of the former transferable protective layer 20 is superior to the physical durability of the latter transferable protective layer by the inclusion of the second protective layer 3B. That is, the protective layer transfer sheet of the second embodiment of the invention is characterized in that it improves the physical durability and improve the chemical durability by means of a synergistic effect of the first protective layer 3A and the second protective layer 3B, and thus, when the transferable protective layer is configured so as to have either one of these layer, there is a tendency that the physical durability, or the chemical durability becomes lower as compared with those of the protective layer transfer sheet of the second embodiment of the present invention.

It is sufficient for the "specific polyester resin" which is included in second protective layer 3B to satisfy the above mentioned conditions of the glass transition temperature (Tg) and the number average molecular weight (Mn). Thus, for example, any condensate of any polyhydric alcohol and any polybasic carboxylic acid, any condensate of any hydroxy carboxylic acid and polyhydric alcohol, and the like, and any product obtained by ring-opening of cyclic lactone, each of which satisfies the above mentioned conditions of the glass transition temperature (Tg) and the number average molecular weight (Mn), can be enumerated.

Further, the "specific polyester resin", may be one that has been cured with a curing agent. However, as the degree of curing proceeds, while certain improvements in chemical and physical durability are expected, the foil tearing property tends to becomes lower although it is slightly.

In consideration of this point, it is preferable that the "specific polyester resin" is contained in the second protective layer 3B in its uncured state, or, in the case of using an isocyanate-based curing agent as the curing agent, for example, it is preferable that a "specific polyester resin" which has been cured within a molar equivalent ratio of isocyanate groups contained in the isocyanate-based curing agent and hydroxyl groups contained in the "specific polyester resin" (—NCO/—OH) of not more than 3 is contained in the second protective layer 3B.

When uncured "specific polyester resin", or "specific polyester resin" in which the degree of the curing reaction is within the above mentioned range of the molar equivalent ratio is included in the second protective layer 3B, the second protective layer 3B can be to impart flexibility, it is possible to prevent the occurrence of cracks which may occur upon bending of the transferable protective layer 20 after transfer. Specifically, since the first protective layer 3A contains the cured resin, the first protective layer 3A itself is in a state in which cracks are likely to occur by bending. When the second protective layer 3B having flexibility is directly laminated to the first protective layer 3A, however, the second protective layer 3B plays a role as a cushion. Thus, even when transferable protective layer 20 after transfer undergoes bending, it is possible to prevent the occurrence of cracks which may occur in the first protective layer 3A.

With respect to the content of the "specific polyester resin" on the basis of the total solid content of the second protective layer 3B, there is no particular limitation. Incidentally, when the content of the "specific polyester resin" is less than 30% by weight, on the basis of the total solid content of the second protective layer 3B, there may be a tendency that the chemical durability and the auxiliary effect enhancing further the physical durability becomes lower. Therefore, it is preferable that the "specific polyester resin" is contained in a ratio of not less than 30% by weight, on the basis of the total solid content of the second protective layer 3B. Here, there is no particular limitation on the upper limit of the content, and it is 100% by weight. In addition, the second protective layer 3B may contains two or more kinds of the "specific polyester resins".

Similarly to the first protective layer 3A, the second protective layer 3B may also contain other optional ingredients. For example, in the embodiment shown in FIG. 5, since the second protective layer 3B is located on the outermost surface of the protective layer transfer sheet 10, the second protective layer 3B comes to the layer that is in contact directly with the transfer receiving article upon the transfer of the transferable protective layer 20 on the transfer receiving article. Thus, in the embodiment shown in FIG. 5, it is necessary for the second protective layer 3 to have an adhesiveness. Here, since the second protective layer 3B containing a "specific polyester resin" has adhesive properties, even when the second protective layer 3B contains only the "specific polyester resin", it is possible to adhere and transfer the transferable protective layer on the transfer receiving article.

In the embodiment shown in FIG. 5, when it is intended to further improve the adhesiveness between the transferable protective layer 20 and the transfer receiving article, it is preferable that the second protective layer 3B contains a component having an adhesive property against the transfer receiving article. As the component having an adhesive property against the transfer receiving article, the "component having adhesiveness to the transfer receiving article" as described above in the explanation for the protective layer transfer sheet of the first embodiment of the present invention can be used by selecting appropriately. Thus, the detailed explanation thereof is omitted here.

Also, the second protective layer 3B may contain the "component having abrasion resistance" as described above in the explanation for the first protective layer 3A. Further, for improving the foil tearing property of the second protective layer 3B, the second protective layer 3B may contain the filler described above in the explanation for the first protective layer 3A.

There is no particular limitation on the method of forming the second protective layer 3B, and for instance, the second protective layer 3B can be formed by preparing a coating liquid for the second protective layer where the "specific polyester resin", and optionally, any component as necessary, are dispersed or dissolved in an appropriate solvent, coating thus prepared coating liquid for the second protective layer on the first protective layer 3A, and then drying the coated solution. Here, with respect to formation of the second protective layer 3B, it is preferable that the second protective layer is developed on the first protective layer before the curing reaction in the first protective layer is completed.

There is no particular limitation on the thickness of the second protective layer 3B, and for instance, it is preferably in a range of not less than 0.5 μm and not more than 10 μm.

In the above explanation, with respect to the protective layer transfer sheet of the construction shown in FIG. 5, the structure where the adhesive property to the transfer receiving article in addition to the physical durability are given to the first protective layer 3A, and the release property from the substrate 1 in addition to the chemical durability are given to the second protective layer 3B has been described. As shown in FIG. 6, however, it may be configured to grant the role of adhesive property to the transfer receiving article and the role of the release property from the substrate 1 to separate the layers. For example, as shown in FIG. 6, between the substrate 1 and the first protective layer 3A, a layer having the release property from the substrate 1 (peeling layer 2) may be provided, and a layer having adhesive property to the transfer receiving article (adhesive layer 4) may be provided onto the second protective layer 3B.

(Peeling Layer)

As component(s) which constitutes the peeling layer 2, the materials exemplified above as the "component having release property from the substrate" may be used by selecting appropriately. It should be noted that the peeling layer 2 is usually a layer to be transferred onto the transfer receiving article, together with the first protective layer 3A and the second protective layer 3B, it may be designed as a layer that remains on the substrate 1 side.

As a method of forming the peeling layer 2, for instance, the peeling layer 2 can be formed by preparing a coating liquid for the peeling layer where the above mentioned "component having release property from the substrate" are dispersed or dissolved in an appropriate solvent, coating thus prepared coating liquid for peeling layer on the substrate 1, in accordance with a known coating procedure such as the gravure printing method, the screen printing method, the reverse roll coating printing method using a gravure plate, or the like, and then drying the coated solution. In general, the thickness of the peeling layer 2 may be in the range of 0.5 μm-5 μm.

(Plasticizer Resistive Layer)

In order to improve the plasticizer resistance of the printed article to which the protective layer 3 was transferred, a plasticizer resistive layer (not shown) may be provided between the substratel and the first protective layer 3A, and in the case that the peeling layer 2 is provided, it may be provided between the peeling layer 2 and the first protective layer 3A. As the plasticizer resistance layer, the plasticizer resistance layer as described above in the explanation of the protective layer transfer sheet of the first embodiment can be used as-is, and thus, the detailed description thereof is omitted here.

(Adhesive Layer)

Further, as shown in FIG. 6, it is possible to provide an adhesive layer 4 on the second protective layer 3B. As the adhesive layer 4, the adhesive layer as described above in the explanation of the protective layer transfer sheet of the first embodiment can be used as-is, and thus, the detailed description thereof is omitted here.

In the above explanation, as an example of the transferable protective layer having the multi-layered structure, the structure where the transferable protective layer includes a release layer, a plasticizer resistance layer and an adhesive layer has been described. Depending on the kinds of the components contained in these optional layers which constitute the transferable protective layer 20, for example, depending on the kinds of the components contained in the peeling layer, the plasticizer resistance layer and the adhesive layer, there are some cases that the foil tearing property for each individual optional layer, per se, becomes insufficient. Even if the foil tearing property of each individual optional layer which is transferred with the protective layer is low, since the second protective layer 3B can shows high adhesiveness not only to the first protective layer 3A which is being in contact with one surface of the second protective layer 3B but also to a layer which is being in contact with another surface of the second protective layer 3B, for example, to the adhesive layer 4, it is possible to satisfy the interlayer adhesiveness between individual layers which constitutes the transferable protective layer 20. Further, since the optional peeling layer 2 is usually very thinner in thickness as compared with the first protective layer 3A and the second protective layer 3B, the foil tearing of the optional peeling layer 2 is not particularly necessary to take into account, and thus, it is possible to satisfy the foil tearing property of the whole transferable protective layer 20.

(Back Face Layer)

As shown in FIG. 6, a back face layer 5 may be provided on a surface of the substrate 1 which is different from another surface on which the transferable protective layer 20 is provided, in order to improve the heat resistance, and to give driving stability to a thermal head on printing. Incidentally, the back face layer 5 is an optional component in the protective layer transfer sheet 10 according to the second embodiment of the present invention. As the back face layer 5, the back face layer as described above in the explanation of the protective layer transfer sheet of the first embodiment can be used as-is, and thus, the detailed description thereof is omitted here.

As described above, the protective layer transfer sheet 10 according to the second embodiment of the present invention is fairly explained. However, without deviating from the scope and the spirit of the present invention, various embodiments other than the ones as disclosed above can be taken in the present invention. For example, the protective layer transfer sheet according to the present invention can be also constructed as a dye layers' integral type protective layer transfer sheet (not shown), wherein dye layers are provided on the same surface of the substrate 1 as the transferable protective layer 20 is provided on, so as to the dye layers are layered in parallel on the substrate across the surface of the substrate, as being frame sequentially. Incidentally, the dye layers may be a single kind of dye layer, or may take a construction, where a yellow dye layer, a magenta dye layer, a cyan dye layer are provided in this order as being frame sequentially.

<<Intermediate Transfer Medium of the Second Embodiment>>

Figure 7:
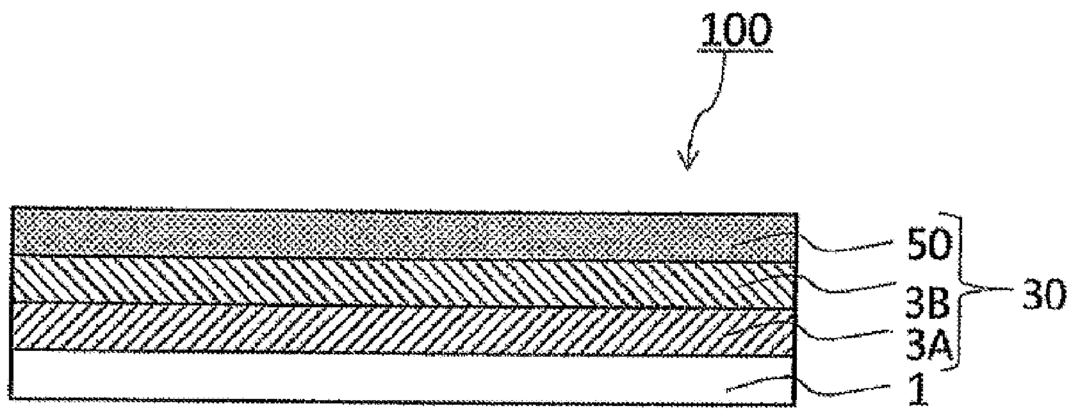
FIG. 7 is a schematic sectional view showing an example of the intermediate transfer medium according to the present invention.
Figure 8:
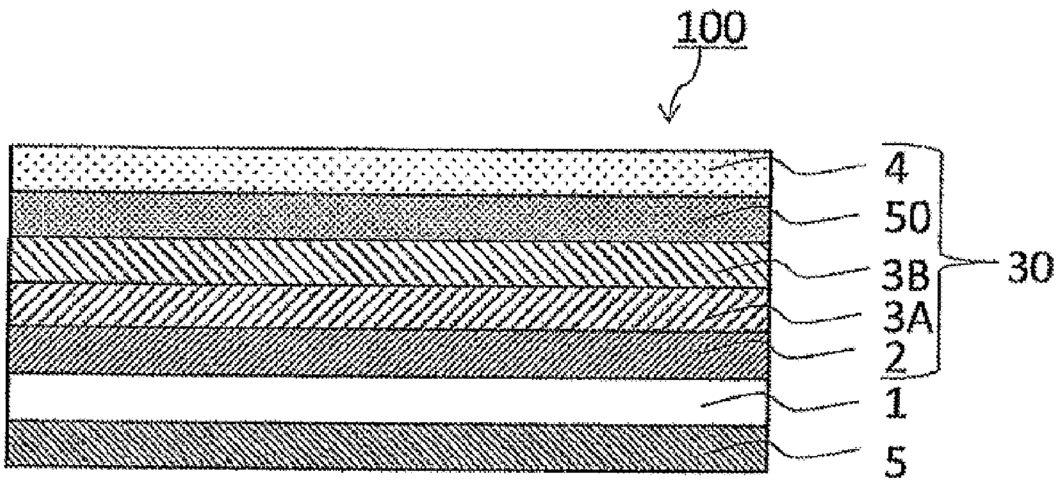
FIG. 8 is a schematic sectional view showing another example of the intermediate transfer medium according to the present invention.

Next, the intermediate transfer medium 100 in the second embodiment of the present invention will be described with reference to FIG. 7. FIG. 7 is a schematic sectional view showing an example of the intermediate transfer medium of the second embodiment of the present invention. As shown in FIG. 7, the intermediate transfer medium 100 in the second embodiment of the present invention comprises a structure wherein a transferable protective layer 20 which is peelable from a substrate 1 are layered on a surface of the substrate 1. The transferable protective layer 20 comprises a layered structure wherein a first protective layer 3A, a second protective layer 3B which is in contact directly with the first protective layer 3A, and a receiving layer 50 are provided in this order from the substrate 1. The present invention is not limited to the embodiment shown in FIG. 7, for example, as shown in FIG. 8, the peeling layer 2 may be provided between the substrate 1 and the first protective layer 3A. The adhesive layer 4 may be provided on the receiving layer 50. Further, a back face layer 5 may be provided on another surface of the substrate 1. Further, between the substrate 1 or the optional peeling layer 2 and the first protective layer, additional protective layer(s) (not shown), or any optional layer(s), may be provided. Similarly, between the second protective layer 3B and the receiving layer 50, additional protective layer(s) (not shown), or any optional layer(s), may be provided.

The intermediate transfer medium of the second embodiment of the invention is different, from the protective layer transfer sheet 10 of the second embodiment of the present invention described above, in that the intermediate transfer medium has as an essential component the receiving layer which is provided directly or indirectly on the second protective layer 3B in the protective layer transfer sheet 10. Hereinafter, each component of the intermediate transfer medium 100 in the second embodiment of the present invention will be described as being mainly about the receiving layer.

(Substrate)

As the substrate 1, it is possible to use the same as the substrate 1 of the protective layer transfer sheet 10 of the second embodiment of the present invention, thus a detailed description thereof will be omitted here.

(Transfer Layer)

The transfer layer 30 including the protective layer 3 and the receiving layer 50 is provided so as to be able to be peeled from the substrate 1, and is a layer to be transferred onto the transfer receiving article by peeling off from the substrate at the time of thermal transfer. The transfer layer 30 constitutes a layered structure which includes the first protective layer 3A, the second protective layer 3B, and the receiving layer 50 as essential components.

(First Protective Layer)

As the first protective layer 3A which constitutes the transfer layer, it is possible to use the same as the first protective layer 3A of the protective layer transfer sheet 10 of the second embodiment of the present invention, thus a detailed description thereof will be omitted here. As the first protective layer 3A, the first protective layer 3A which contains the cured resin obtained by curing the acrylic polyol resin with the curing agent, and the first protective layer 3A of other preferred embodiments are desirable.

(Second Protective Layer)

As the second protective layer 3B which constitutes the transfer layer, it is possible to use the same as the second protective layer 3B of the protective layer transfer sheet 10 of the second embodiment of the present invention, thus a detailed description thereof will be omitted here.

Incidentally, with respect to the intermediate transfer medium 100 in the second embodiment of the present invention, since the receiving layer 50 provided on the second protective layer 3B is directly, or indirectly via any of the layers such as the adhesive layer, on the transfer receiving article, it does not require that the second protective layer 3B itself has adhesive properties.

The transfer layer 30 in the intermediate transfer medium of the second embodiment of the present invention, as is the case with the transferable protective layer 20 of the protective layer transfer sheet 10 of the second embodiment of the present invention, includes the first protective layer 3A, the second protective layer 3B, and the first protective layer 3A and the second protective layer 3B are directly in contact with each other. Therefore, by transferring the transfer layer 30 onto the transfer receiving article, it is possible to obtain a printed article having excellent physical, and chemical durability. In addition, since the second protective layer 3B has a high adhesiveness to a layer in contact with said second protective layer 3B, as compared with the first protective layer 3A, it is possible to improve the interlayer adhesiveness between the second protective layer 3B and the receiving layer 50. Further, since the interlayer adhesiveness between the first protective layer 3A and the second protective layer 3B is also high, it is possible to improve the interlayer adhesiveness between the layers constituting the transfer layer 30, and it is possible to impart a good foil tearing property of the whole transfer layer 30.

(Receiving Layer)

As shown in FIG. 7, on the second protective layer 3B, the receiving layer 50 is provided. The receiving layer 50 is a layer which is included in the transfer layer 30. On the receiving layer, an image will be formed. Then, the receiving layer 50, on which the image have been thus formed, is transferred in conjunction with the first protective layer 3A and the second protective layer 3B onto a transfer receiving article. As a result, a printed article is produced. As the receiving layer which constitutes the transfer layer, the receiving layer as described above in the explanation of the intermediate transfer medium of the first embodiment can be used as-is, and thus, the detailed description thereof is omitted here.

(Back Face Layer)

As shown in FIG. 7, a back face layer 5 may be provided on another surface of the substrate 1 As the back face layer 5, the back face layer as described above in the explanation of the protective layer transfer sheet of the second embodiment can be used as-is, and thus, the detailed description thereof is omitted here.

EXAMPLES

Next, the present invention will be described more concretely with demonstrating examples and comparative examples. Hereinafter, unless otherwise specified, the expressions of "part (s)" and "%" mean those by weight. Further, "Tg" represents the glass transition temperature, and "Mw" represents the weight average molecular weight.

Example 1

Using a polyethylene terephthalate film (manufactured by Toray, Industries, Inc., Lumirror) of 12 rpm in thickness as a substrate, and coating a coating liquid for peeling layer having the following composition onto one side of the substrate so as to obtain a film thickness of 1.0 g/m$^2$ in dried state, and then drying, a peeling layer was formed. After that, coating a coating liquid for protective layer 1 having the following composition onto thus formed peeling layer so as to obtain a film thickness of 2.0 g/m$^2$ in dried state, and then drying, a protective layer was formed. Next, coating a coating liquid for receiving layer 1 having the following composition onto thus formed protective layer so as to obtain a film thickness of 1.0 g/m$^2$ in dried state, and then drying, a receiving layer was formed. Ultimately, the intermediate transfer medium of Example 1 was prepared. Herein, all the coatings of the coating liquid for peeling layer, the coating liquid for protective layer 1, and the coating liquid for receiving layer were performed in accordance with gravure coating.

| <Coating liquid for peeling layer> | |
|---|---|
| acrylic resin<br>(BR-87, manufactured by Mitsubishi Rayon Co., Ltd.) | 80 parts |
| polyester resin<br>(Vylon 200, manufactured by TOYOBO Co., Ltd.) | 5 parts |
| polyethylene wax<br>(Polywax 1000, manufactured by TOYO ADL Corp.) | 5 parts |
| UV absorbing acrylic resin (PUVA-50M-40TM,<br>manufactured by Otsuka Chemical Co., Ltd.) | 10 parts |
| toluene | 200 parts |
| methyl ethyl ketone | 200 parts |

| <Coating liquid for protective layer 1> | |
|---|---|
| molar equivalent ratio (-epoxy group/-amino group): 0.5<br>amino-modified acrylic resin (solid content: 40%,<br>Tg: 75° C., Mw: 53000)<br>(LK-730, manufactured by Toray Fine Chemicals Co., Ltd.) | 100 parts |
| epoxy curing agent (Denacol EX-612,<br>manufactured by Nagase ChemteX Corporation) | 2.1 parts |
| toluene/isobutanol = 1/1 mixed solvent | 100 parts |

| <Coating liquid for receiving layer> | |
|---|---|
| vinyl chloride-vinyl acetate copolymer<br>(CNL, manufactured by Nissin Chemical Industry Co., Ltd.) | 95 parts |
| epoxy modified silicone oil<br>(KP-1800U, manufactured by Shin-Etsu Chemical Co., Ltd.) | 5 parts |
| toluene | 200 parts |
| MEK | 200 parts |

Example 2

The same procedure as described in Example 1 was repeated, except for replacing the coating liquid for protective layer 1 with a coating liquid for protective layer 2 having the following composition, in order to prepare an intermediate transfer medium of Example 2.

| <Coating liquid for protective layer 2> | |
|---|---|
| molar equivalent ratio (-epoxy group/-amino group): 1.0<br>amino-modified acrylic resin (solid content: 40%,<br>Tg: 75° C., Mw: 53000)<br>(LK-730, manufactured by Toray Fine Chemicals Co., Ltd.) | 100 parts |
| epoxy curing agent (Denacol EX-612,<br>manufactured by Nagase ChemteX Corporation) | 4.25 parts |
| toluene/isobutanol = 1/1 mixed solvent | 100 parts |

Example 3

The same procedure as described in Example 1 was repeated, except for replacing the coating liquid for protective layer 1 with a coating liquid for protective layer 3 having the following composition, in order to prepare an intermediate transfer medium of Example 3.

| <Coating liquid for protective layer 3> | |
|---|---|
| molar equivalent ratio (-epoxy group/-amino group): 2.0<br>amino-modified acrylic resin (solid content: 40%,<br>Tg: 75° C., Mw: 53000)<br>(LK-730, manufactured by Toray Fine Chemicals Co., Ltd.) | 100 parts |

-continued

| <Coating liquid for protective layer 3> | |
|---|---|
| epoxy curing agent (Denacol EX-612, manufactured by Nagase ChemteX Corporation) | 8.5 parts |
| toluene/isobutanol = 1/1 mixed solvent | 100 parts |

Example 4

The same procedure as described in Example 1 was repeated, except for replacing the coating liquid for protective layer 1 with a coating liquid for protective layer 4 having the following composition, in order to prepare an intermediate transfer medium of Example 4.

| <Coating liquid for protective layer 4> | |
|---|---|
| molar equivalent ratio (- epoxy group/- amino group): 3.0 amino-modified acrylic resin (solid content: 40%, Tg: 75° C., Mw: 53000) (LK-730, manufactured by Toray Fine Chemicals Co., Ltd.) | 100 parts |
| epoxy curing agent (Denacol EX-612, manufactured by Nagase ChemteX Corporation) | 12.75 parts |
| toluene/isobutanol = 1/1 mixed solvent | 100 parts |

Example 5

The same procedure as described in Example 1 was repeated, except for replacing the coating liquid for protective layer 1 with a coating liquid for protective layer 5 having the following composition, in order to prepare an intermediate transfer medium of Example 5.

| <Coating liquid for protective layer 5> | |
|---|---|
| molar equivalent ratio (- epoxy group/- amino group): 1.0 amino-modified acrylic resin (solid content: 50%, Tg: 63° C., Mw: 31000) (LK-723, manufactured by Toray Fine Chemicals Co., Ltd.) | 100 parts |
| epoxy curing agent (Denacol EX-612, manufactured by Nagase ChemteX Corporation) | 3.23 parts |
| toluene/isobutanol = 1/1 mixed solvent | 100 parts |

Example 6

The same procedure as described in Example 1 was repeated, except for replacing the coating liquid for protective layer 1 with a coating liquid for protective layer 6 having the following composition, in order to prepare an intermediate transfer medium of Example 6.

| <Coating liquid for protective layer 6> | |
|---|---|
| molar equivalent ratio (- epoxy group/- amino group): 2.0 amino-modified acrylic resin (solid content: 50%, Tg: 63° C., Mw: 31000) (LK-723, manufactured by Toray Fine Chemicals Co., Ltd.) | 100 parts |
| epoxy curing agent (Denacol EX-612, manufactured by Nagase ChemteX Corporation) | 6.46 parts |
| toluene/isobutanol = 1/1 mixed solvent | 100 parts |

Example 7

The same procedure as described in Example 1 was repeated, except for replacing the coating liquid for protective layer 1 with a coating liquid for protective layer 7 having the following composition, in order to prepare an intermediate transfer medium of Example 7.

| <Coating liquid for protective layer 7> | |
|---|---|
| molar equivalent ratio (- epoxy group/- amino group); 2.0 amino-modified acrylic resin (solid content: 50%, Tg: 60° C., Mw: 25000) (LK-714, manufactured by Toray Fine Chemicals Co., Ltd.) | 100 parts |
| epoxy curing agent (Denacol EX-612, manufactured by Nagase ChemteX Corporation) | 6.46 parts |
| toluene/isobutanol = 1/1 mixed solvent | 100 parts |

Example 8

The same procedure as described in Example 1 was repeated, except for omitting the formation of peeling layer and replacing the coating liquid for protective layer 1 with a coating liquid for peeling layer—cum—protective layer 1 having the following composition, in order to prepare an intermediate transfer medium of Example 8. The coating liquid for peeling layer—cum—protective layer 1 was coated so as to obtain a film thickness of 3.0 g/$m^2$ in dried state.

| <Coating liquid for peeling layer - cum - protective layer 1> | |
|---|---|
| molar equivalent ratio (- epoxy group/- amino group): 1.0 amino-modified acrylic resin (solid content: 40%, Tg: 75° C., Mw: 53000) (LK-730, manufactured by Toray Fine Chemicals Co., Ltd.) | 100 parts |
| epoxy curing agent (Denacol EX-612, manufactured by Nagase ChemteX Corporation) | 8.5 parts |
| polyethylene wax (Polywax 1000, manufactured by TOYO ADL Corp.) | 5 parts |
| UV absorbing acrylic resin (PUVA-50M-40TM, manufactured by Otsuka Chemical Co., Ltd.) | 10 parts |
| toluene/isobutanol = 1/1 mixed solvent | 200 parts |

Comparative Example 1

The same procedure as described in Example 1 was repeated, except for replacing the coating liquid for protective layer 1 with a coating liquid for protective layer A having the following composition, in order to prepare an intermediate transfer medium of Comparative example 1.

| <Coating liquid for protective layer A> | |
|---|---|
| amino-modified acrylic resin (solid content: 40%, Tg: 75° C., Mw: 53000) (LK-730, manufactured by Toray Fine Chemicals Co., Ltd.) | 100 parts |
| toluene/isobutanol = 1/1 mixed solvent | 100 parts |

Comparative Example 2

The same procedure as described in Example 1 was repeated, except for replacing the coating liquid for protective layer 1 with a coating liquid for protective layer B having the following composition, in order to prepare an intermediate transfer medium of Comparative example 2.

| <Coating liquid for protective layer B> | |
|---|---|
| molar equivalent ratio (- epoxy group/- amino group): 1.0 | 100 parts |
| amino-modified acrylic resin (solid content: 55%, | |
| Tg: 59° C., Mw: 13000) | |
| (LK-707, manufactured by Toray Fine Chemicals Co., Ltd.) | |
| epoxy curing agent | 7.14 parts |
| (Denacol EX-612, manufactured by Nagase ChemteX Corporation) | |
| toluene/isobutanol = 1/1 mixed solvent | 100 parts |

Comparative Example 3

The same procedure as described in Example 1 was repeated, except for replacing the coating liquid for protective layer 1 with a coating liquid for protective layer C having the following composition, in order to prepare an intermediate transfer medium of Comparative example 3.

| <Coating liquid for protective layer C> | |
|---|---|
| polyester resin | 20 parts |
| (Vylon 200, manufactured by TOYOBO Co., Ltd.) | |
| Methyl ethyl ketone/toluene = 1/1 mixed solvent | 80 parts |

Comparative Example 4

The same procedure as described in Example 1 was repeated, except for replacing the coating liquid for protective layer 1 with a coating liquid for protective layer D having the following composition, in order to prepare an intermediate transfer medium of Comparative example 4.

| <Coating liquid for protective layer D> | |
|---|---|
| polyester resin | 20 parts |
| (Vylon 600, manufactured by TOYOBO Co., Ltd.) | |
| Methyl ethyl ketone/toluene = 1/1 mixed solvent | 80 parts |

Comparative Example 5

The same procedure as described in Example 1 was repeated, except for replacing the coating liquid for protective layer 1 with a coating liquid for protective layer E having the following composition, in order to prepare an intermediate transfer medium of Comparative example 5.

| <Coating liquid for protective layer E> | |
|---|---|
| acrylic resin | 20 parts |
| (Dianal BR-87, manufactured by Mitsubishi Rayon Co., Ltd.) | |
| Methyl ethyl ketone/toluene = 1/1 mixed solvent | 80 parts |

(Formation of Printed Article)

Using HDP-600 printer (manufactured by HID), and thermal transfer sheet prepared by the following procedure, a black solid image was printed onto each individual receiving layer of the intermediate transfer media of Examples and Comparative Examples under the default condition. Then, using the same printer, the peeling layer, protective layer (with respect to Example 8, peeling layer—cum—protective layer), and receiving layer after the formation of black solid image of each individual intermediate transfer medium was transferred to a card made of polyvinyl chloride (manufactured by Dai Nippon Printing Co., Ltd) under the retransfer condition of 175° C., 2 sec/inch. the card. Thus, printed articles of Examples 1-8 and Comparative examples 1-5 were obtained.

(Preparation of Thermal Transfer Sheet)

As a substrate, polyethylene terephthalate film which underwent easy-adhesive treatment in advance, and has 4.5 μm in thickness was used. On this substrate, a liquid for forming heat resistant active layer having the following composition was coated so as to obtain a thickness of 0.8 $g/m^2$ in the dried state and then the coated liquid was dried to form a heat resistant active layer. Then, on another surface of the substrate, a liquid for forming yellow dye layer having the following composition, a liquid for forming magenta dye layer having the following composition, and a liquid for forming cyan dye layer having the following composition were coated so as to obtain each individual thickness of 0.6 $g/m^2$ in the dried state, and then the coated liquids were dried through a repeated face-by-face operation for each color in this order in order to form the respective dye layers. Ultimately, a thermal transfer sheet was prepared.

| <Coating liquid for heat resistance active layer> | |
|---|---|
| Polyvinyl butyral resin | 2.0 parts |
| (S-LEC BX-1, manufactured by Sekisui Chemical Co., Ltd.) | |
| Polyisocyanate | 9.2 parts |
| (BURNOCK D750, manufactured by DIC Corporation) | |
| Phosphoric ester type surfactant | 1.3 parts |
| (PLY SURF A208N, manufactured by Dai-ichi Kogyo, Seiyaku, Co., Ltd.) | |
| Talc | 0.3 parts |
| (MICRO ACE P-3, manufactured by Nippon Talc Co. Ltd.) | |
| toluene | 43.6 parts |
| methyl ethyl ketone | 43.6 parts |

| <Coating liquid for yellow dye layer> | |
|---|---|
| Dye represented by the following formula | 4.0 parts |
| polyvinyl acetal resin | 3.5 parts |
| (S-LEC KS-5, manufactured by Sekisui Chemical Co., Ltd.) | |
| Polyethylene wax | 0.1 part |
| Methyl ethyl ketone | 45.0 parts |
| Toluene | 45.0 parts |

[Chem. 1]

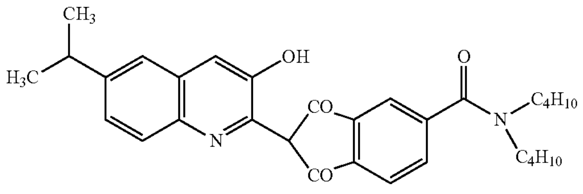

| <Coating liquid for magenta dye layer> | |
|---|---|
| Disperse dye (Disperse Red 60) | 1.5 parts |
| Disperse dye (Disperse Violet 26) | 2.0 parts |
| polyvinyl acetal resin | 4.5 parts |
| (S-LEC KS-5, manufactured by Sekisui Chemical Co., Ltd.) | |

-continued

| <Coating liquid for magenta dye layer> | |
|---|---|
| Polyethylene wax | 0.1 part |
| Methyl ethyl ketone | 45.0 parts |
| Toluene | 45.0 parts |

| <Coating liquid for cyan dye layer> | |
|---|---|
| Disperse dye (Solvent Blue 63) | 4.0 parts |
| polyvinyl acetal resin (S-LEC KS-5, manufactured by Sekisui Chemical Co., Ltd.) | 3.5 parts |
| Polyethylene wax | 0.1 part |
| Methyl ethyl ketone | 45.0 parts |
| Toluene | 45.0 parts |

(Foil Tearing Evaluation)

As the evaluation of the foil tearing of Examples and Comparative examples, blooming of each print was observed visually, and the evaluation of this test was done under the following evaluation criteria. The evaluation test results are shown in table 1. Herein, the blooming means the length of the transfer layer which protruded from the boundary between the non-transferred region and the transferred region of the transfer layer, as the starting point, to the non-transferred region side.

<Evaluation Criteria>

◎: There was no visible blooming.

○: The blooming was less than 0.3 mm.

x: The blooming was not less than 0.3 mm.

(Evaluation of Plasticizer Resistance)

Onto each printed article of Examples and Comparative examples, plasticizer (DOP) was added. Then, the printed article was covered with a PET film, and it was kept for 8 hours at 40° C. After the time elapsed, the surface condition of the printed article was observed visually. Evaluation was done under the following evaluation criteria. The evaluation results are shown in Table 1.

<Evaluation Criteria>

○: No damage was observed in the image.

Δ: Although a little damage was observed in the image, but it was within the level of causing no problem in use.

x: Damage which causes problems in use was observed in the image.

(Evaluation of Solvent Resistance)

Each printed article of Examples and Comparative examples underwent 30 times of reciprocating motions of a methyl ethyl ketone (MEK) soaked cotton swab. After the predetermined times of reciprocating motions, the surface condition of the image was observed visually. Evaluation was done under the following evaluation criteria. The evaluation results are shown in Table 1.

<Evaluation Criteria>

○: No damage was observed in the image.

Δ: Although a little damage was observed in the image, but it was within the level of causing no problem in use.

x: Damage which causes problems in use was observed in the image.

(Evaluation of Abrasion Resistance)

Each printed article of Examples and Comparative Examples underwent wearing by using a wear ring CS-10F under a load of 500 gf and was run for 250 revolutions. After wearing, the condition of the surface was observed visually, and evaluation of this test was done under the following evaluation criteria. The evaluation test results are shown in table 1.

<Evaluation Criteria>

○: Scratch was not observed on the printed article at all.

Δ: Although a few scratches were observed on the printed article, but it was within the level of causing no problem in use.

x: A considerable amount of scratches were observed on the printed article.

TABLE 1

| | Foil tearing | Plasticizer resistance | Solvent resistance | Abrasion resistance |
|---|---|---|---|---|
| Example 1 | ◎ | Δ | ○ | ○ |
| Example 2 | ◎ | ○ | ○ | ○ |
| Example 3 | ○ | ○ | ○ | ○ |
| Example 4 | ○ | ○ | ○ | ○ |
| Example 5 | ◎ | ○ | ○ | ○ |
| Example 6 | ◎ | ○ | ○ | ○ |
| Example 7 | ◎ | ○ | ○ | ○ |
| Example 8 | ○ | ○ | ○ | ○ |
| Comparative example 1 | ○ | Δ | X | Δ |
| Comparative example 2 | ○ | X | X | X |
| Comparative example 3 | X | Δ | X | ○ |
| Comparative example 4 | ○ | X | X | ○ |
| Comparative example 5 | ○ | Δ | X | X |

Example 9

Using a polyethylene terephthalate film (manufactured by Toray, Industries, Inc., Lumirror) of 12 μm in thickness as a substrate, and coating the coating liquid for peeling layer having the above mentioned composition onto one side of the substrate so as to obtain a film thickness of 1.0 $g/m^2$ in dried state, and then drying, a peeling layer was formed. After that, coating a coating liquid for protective layer 8 having the following composition onto thus formed peeling layer so as to obtain a film thickness of 2.0 $g/m^2$ in dried state, and then drying at 100° C. for 2 minutes, a first protective layer was formed. Within 1 minute after the first protective layer was formed, coating a coating liquid for protective layer 9 having the following composition onto thus formed the first protective layer so as to obtain a film thickness of 2.0 $g/m^2$ in dried state, and then drying at 100° C. for 2 minutes, a second protective layer was formed. Then, coating the coating liquid for receiving layer having the above mentioned composition onto thus formed the second protective layer so as to obtain a film thickness of 1.0 $g/m^2$ in dried state, and then drying, a receiving layer was formed. Ultimately, the intermediate transfer medium of Example 9 was prepared. Herein, all the coatings of the coating liquid for peeling layer, the coating liquid for protective layer 8, the coating liquid for protective layer 9, and the coating liquid for receiving layer were performed in accordance with gravure coating.

| <Coating liquid for protective layer 8> | |
|---|---|
| molar equivalent ratio (—NCO/—OH): 1.0 acrylic polyol resin (solid content; 45%, Tg: 97° C., Mw: 23000, hydroxyl value (solid): 60, —OH: 27) (Q-164, manufactured by Mitsui Chemicals Co., Ltd.) | 100 parts |

-continued

| <Coating liquid for protective layer 8> | |
|---|---|
| isocyanate type curing agent (solid content: 75% —NCO: 11.5%) (TAKENATE D110N (XDI type), manufactured by Mitsui Chemicals Co., Ltd.) | 17.6 parts |
| Methyl ethyl ketone | 170 parts |

| <Coating liquid for protective layer 9> | |
|---|---|
| polyester resin (Mn: 17000 Tg: 67° C.) (Vylon 200, manufactured by TOYOBO Co., Ltd.) | 80 parts |
| Methyl ethyl ketone | 20 parts |

Example 10

The same procedure as described in Example 9 was repeated, except for replacing the coating liquid for protective layer 9 with a coating liquid for protective layer 10 having the following composition in the formation of the second protective layer, in order to prepare an intermediate transfer medium of Example 10.

| <Coating liquid for protective layer 10> | |
|---|---|
| polyester resin (Mn: 10000 Tg: 60° C.) (GK-250, manufactured by TOYOBO Co., Ltd.) | 20 parts |
| Methyl ethyl ketone | 80 parts |

Example 11

The same procedure as described in Example 9 was repeated, except for replacing the coating liquid for protective layer 9 with a coating liquid for protective layer 11 having the following composition in the formation of the second protective layer, in order to prepare an intermediate transfer medium of Example 11.

| <Coating liquid for protective layer 11> | |
|---|---|
| polyester resin (Mn: 16000 Tg: 47° C.) (Vylon 600, manufactured by TOYOBO Co., Ltd.) | 20 parts |
| Methyl ethyl ketone | 80 parts |

Example 12

The same procedure as described in Example 9 was repeated, except for replacing the coating liquid for protective layer 9 with a coating liquid for protective layer 12 having the following composition in the formation of the second protective layer, in order to prepare an intermediate transfer medium of Example 12.

| <Coating liquid for protective layer 12> | |
|---|---|
| polyester resin (Mn: 17000 Tg: 67° C.) (Vylon 200, manufactured by TOYOBO Co., Ltd.) | 15 parts |
| polyester resin (Mn: 3000 Tg: 53° C.) (Vylon 220, manufactured by TOYOBO Co., Ltd.) | 5 parts |
| Methyl ethyl ketone | 80 parts |

Example 13

The same procedure as described in Example 9 was repeated, except for replacing the coating liquid for protective layer 9 with a coating liquid for protective layer 13 having the following composition in the formation of the second protective layer, in order to prepare an intermediate transfer medium of Example 13.

| <Coating liquid for protective layer 13> | |
|---|---|
| polyester resin (Mn: 17000 Tg: 67° C.) (Vylon 200, manufactured by TOYOBO Co., Ltd.) | 10 parts |
| polyester resin (Mn: 3000 Tg: 53° C.) (Vylon 220, manufactured by TOYOBO Co., Ltd.) | 10 parts |
| Methyl ethyl ketone | 80 parts |

Example 14

The same procedure as described in Example 9 was repeated, except for replacing the coating liquid for protective layer 9 with a coating liquid for protective layer 14 having the following composition in the formation of the second protective layer, in order to prepare an intermediate transfer medium of Example 14.

| <Coating liquid for protective layer 13> | |
|---|---|
| polyester resin (Mn: 17000 Tg: 67° C.) (Vylon 200, manufactured by TOYOBO Co., Ltd.) | 10 parts |
| polyester resin (Mn: 5000 Tg: 52° C.) (UE-3350, manufactured by Unitika Co., Ltd.) | 10 parts |
| Methyl ethyl ketone | 80 parts |

Example 15

The same procedure as described in Example 9 was repeated, except for replacing the coating liquid for protective layer 8 with a coating liquid for protective layer 15 having the following composition in the formation of the first protective layer, in order to prepare an intermediate transfer medium of Example 15.

| <Coating liquid for protective layer 8> | |
|---|---|
| molar equivalent ratio (—NCO/—OH): 1.0 acrylic polyol resin (solid content: 45%, Tg: 75° C., Mw: 29000, hydroxyl value (solid): 61, —OH: 28.06) (LH-613, manufactured by Toray Fine Chemicals Co., Ltd.) | 100 parts |
| isocyanate type curing agent (solid content: 75% —NCO: 11.5%) (TAKENATE D110N (XDI type), manufactured by Mitsui Chemicals Co., Ltd.) | 18.3 parts |
| Methyl ethyl ketone | 170 parts |

Example 15

The same procedure as described in Example 9 was repeated, except for replacing the coating liquid for protective layer 8 with a coating liquid for protective layer 16 having the following composition in the formation of the first protective layer, in order to prepare an intermediate transfer medium of Example 16.

| <Coating liquid for protective layer 16> | |
|---|---|
| molar equivalent ratio (—NCO/—OH): 1.0 acrylic polyol resin (solid content: 55%, Tg: 53° C., Mw: 26600, hydroxyl value (solid): 72.7, —OH: 40) (WZU-591, manufactured by DIC Corporation.) | 100 parts |
| isocyanate type curing agent (solid content: 75% —NCO: 11.5%) (TAKENATE D110N (XDI type), manufactured by Mitsui Chemicals Co., Ltd.) | 26 parts |
| Methyl ethyl ketone | 170 parts |

Example 17

The same procedure as described in Example 9 was repeated, except for replacing the coating liquid for protective layer 8 with the coating liquid for protective layer 1 having the above mentioned composition in the formation of the first protective layer, in order to prepare an intermediate transfer medium of Example 17.

Example 18

The same procedure as described in Example 9 was repeated, except for replacing the coating liquid for protective layer 8 with the coating liquid for protective layer 4 having the above mentioned composition in the formation of the first protective layer, and replacing the coating liquid for protective layer 9 with the coating liquid for protective layer 11 having the above mentioned composition in the formation of the second protective layer, in order to prepare an intermediate transfer medium of Example 18.

Example 19

The same procedure as described in Example 9 was repeated, except for replacing the coating liquid for protective layer 8 with the coating liquid for protective layer 7 having the above mentioned composition in the formation of the first protective layer, and replacing the coating liquid for protective layer 9 with the coating liquid for protective layer 11 having the above mentioned composition in the formation of the second protective layer, in order to prepare an intermediate transfer medium of Example 19.

Example 20

The same procedure as described in Example 9 was repeated, except for replacing the coating liquid for protective layer 8 with the coating liquid for protective layer 7 having the above mentioned composition in the formation of the first protective layer, and replacing the coating liquid for protective layer 9 with the coating liquid for protective layer 14 having the above mentioned composition in the formation of the second protective layer, in order to prepare an intermediate transfer medium of Example 20.

Example 21

The same procedure as described in Example 9 was repeated, except for replacing the coating liquid for protective layer 8 with the coating liquid for protective layer 7 having the above mentioned composition in the formation of the first protective layer, and replacing the coating liquid for protective layer 9 with the coating liquid for protective layer 17 having the following composition in the formation of the second protective layer, in order to prepare an intermediate transfer medium of Example 21.

| <Coating liquid for protective layer 17> | |
|---|---|
| acrylic resin (Tg: 105° C., Mw: 95000) (BR-80, manufactured by Mitsubishi Rayon Co., Ltd.) | 20 parts |
| Methyl ethyl ketone | 80 parts |

Example 22

The same procedure as described in Example 9 was repeated, except for replacing the coating liquid for protective layer 8 with a coating liquid for protective layer 18 having the following composition in the formation of the first protective layer, in order to prepare an intermediate transfer medium of Example 22.

| <Coating liquid for protective layer 18> | |
|---|---|
| molar equivalent ratio (—NCO/—OH): 1.0 acrylic polyol resin (solid content: 50%, Tg: 48° C., Mw: 40000, hydroxyl value (solid): 100, —OH: 50) (A-801-P, manufactured by DIC Corporation) | 100 parts |
| isocyanate type curing agent (solid content: 75% —NCO: 11.5%) (TAKENATE D110N (XDI type), manufactured by Mitsui Chemicals Co., Ltd.) | 32.5 parts |
| Methyl ethyl ketone | 240 parts |

Comparative Example 6

The same procedure as described in Example 9 was repeated, except for replacing the coating liquid for protective layer 8 with a coating liquid for protective layer 9 having the above mentioned composition in the formation of the first protective layer, and omitting the formation of the second protective layer, in order to prepare an intermediate transfer medium of Comparative Example 6.

Comparative Example 7

The same procedure as described in Example 9 was repeated, except for replacing the coating liquid for protective layer 8 with a coating liquid for protective layer 11 having the above mentioned composition in the formation of the first protective layer, and omitting the formation of the second protective layer, in order to prepare an intermediate transfer medium of Comparative Example 7.

Comparative Example 8

The same procedure as described in Example 9 was repeated, except for replacing the coating liquid for protective layer 8 with a coating liquid for protective layer 17 having the above mentioned composition in the formation of the first protective layer, and omitting the formation of the second protective layer, in order to prepare an intermediate transfer medium of Comparative Example 8.

Comparative Example 9

The same procedure as described in Example 9 was repeated, except for replacing the coating liquid for protective layer 8 with a coating liquid for protective layer 19 having the following composition in the formation of the first protective layer, and omitting the formation of the second protective layer, in order to prepare an intermediate transfer medium of Comparative Example 9.

| <Coating liquid for protective layer 19> | |
|---|---|
| acrylic resin (Tg: 105° C., Mw: 25000) (BR-87, manufactured by Mitsubishi Rayon Co., Ltd.) | 20 parts |
| Methyl ethyl ketone | 80 parts |

Comparative Example 10

The same procedure as described in Example 9 was repeated, except for replacing the coating liquid for protective layer 9 with the coating liquid for protective layer 19 having the above mentioned composition in the formation of the second protective layer, in order to prepare an intermediate transfer medium of Comparative Example 10.

Comparative Example 11

The same procedure as described in Example 9 was repeated, except for replacing the coating liquid for protective layer 9 with a coating liquid for protective layer 20 having the following composition in the formation of the second protective layer, in order to prepare an intermediate transfer medium of Comparative Example 11.

| <Coating liquid for protective layer 20> | |
|---|---|
| polyeseter resin (Mn: 11000, Tg: 36° C.) (GK-780, manufactured by TOYOBO Co., Ltd.) | 20 parts |
| Methyl ethyl ketone | 80 parts |

Comparative Example 12

The same procedure as described in Example 9 was repeated, except for replacing the coating liquid for protective layer 9 with a coating liquid for protective layer 21 having the following composition in the formation of the second protective layer, in order to prepare an intermediate transfer medium of Comparative Example 12.

| <Coating liquid for protective layer 21> | |
|---|---|
| polyester resin (Mn: 5000, Tg: 52° C.) (UE-3350, manufactured by Unitika Co., Ltd.) | 20 parts |
| Methyl ethyl ketone | 80 parts |

Comparative Example 13

The same procedure as described in Example 9 was repeated, except for replacing the coating liquid for protective layer 9 with a coating liquid for protective layer 22 having the following composition in the formation of the second protective layer, in order to prepare an intermediate transfer medium of Comparative Example 13.

| <Coating liquid for protective layer 22> | |
|---|---|
| polyester resin (Mn: 3000, Tg: 53° C.) (Vylon 220, manufactured by TOYOBO Co., Ltd.) | 20 parts |
| Methyl ethyl ketone | 80 parts |

Comparative Example 14

The same procedure as described in Example 9 was repeated, except for replacing the coating liquid for protective layer 8 with the coating liquid for protective layer 19 having the above mentioned composition in the formation of the first protective layer, in order to prepare an intermediate transfer medium of Comparative Example 14.

(Formation of Printed Article)

Using HDP-600 printer (manufactured by HID), and thermal transfer sheet prepared by the above mentioned procedure, a gray solid image was printed onto each individual receiving layer of the intermediate transfer media of Examples and Comparative Examples under the default condition. Then, using the same printer, the receiving layer, the protective layer and the peeling layer after the formation of gray solid image of each individual intermediate transfer medium was transferred to a card made of polyvinyl chloride (manufactured by Dai Nippon Printing Co., Ltd) under the retransfer condition of 175° C., 2 sec/inch. Thus, printed articles of Examples 9-22 and Comparative examples 6-14 were obtained.

(Foil Tearing Evaluation)

The foil tearing (blooming) of the printed matter of each Examples and Comparative examples was observed by visually, and evaluation of this test was done under the following evaluation criteria. The evaluation test results are shown in table 2.

Herein, the blooming means the length of the transfer layer which protruded from the boundary between the non-transferred region and the transferred region of the transfer layer, as the starting point, to the non-transferred region side.

<Evaluation Criteria>

◯: There was no visible blooming.

○: The blooming was not more than 0.3 mm.

Δ: Although a slight blooming (0.3 mm-1.0 mm) was observed in the image, but it was within the level of causing no problem in use.

x: Considerable blooming (not less than 1.0 mm) was observed.

(Durability Evaluation)

Each printed article of Examples and Comparative Examples underwent wearing by using a wear ring CS-10F under a load of 500 gf and was run for 400 revolutions. After wearing, the condition of the surface was observed by visually, and evaluation of this test was done under the following evaluation criteria. The evaluation test results are shown in table 2.

<Evaluation Criteria>

◯: Scratch was not observed on the image at all.

○: A little amount of scratches were observed on the image.

Δ: Although scratches were observed on the image, but it was within the level of causing no problem in use.

x: The image was considerably removed, and a considerable amount of scratches were observed on the printed article.

(Evaluation of Plasticizer Resistance)

Each printed article of Examples and Comparative Examples underwent bending in the direction of front and rear, and the direction of vertical and horizontal, for 300 times each direction by using a bending test machine. After the bending, plasticizer (DOP) was applied onto each printed article, and it was kept for 12 hours at 40° C. After the time elapsed, the printed article was visually observed to determine whether the image was deteriorated or not. Evaluation was done under the following evaluation criteria. The evaluation results are shown in Table 2.

<Evaluation Criteria>

○: No deterioration was observed in the image.

Δ: A little deterioration was observed in the image x: Considerable deterioration was observed in the image.

(Evaluation of Alcohol Resistance)

Each printed article of Examples and Comparative examples was immersed in ethanol for 24 hours. After the immersion in ethanol, the printed article was visually observed to determine whether the image of the printed article was deteriorated or not. Evaluation was done under the following evaluation criteria. The evaluation results are shown in Table 2.

<Evaluation Criteria>

○: No deterioration was observed in the image.

Δ: The image was turned to matt slightly.

x: The image was turned to matt considerably.

TABLE 2

| | Foil tearing | Durability | Plasticizer resistance | Alcohol resistance |
|---|---|---|---|---|
| Example 9 | ○ | ◎ | ○ | ○ |
| Example 10 | ◎ | Δ | ○ | ○ |
| Example 11 | ◎ | ○ | ○ | Δ |
| Example 12 | ◎ | ○ | ○ | ○ |
| Example 13 | ◎ | Δ | ○ | ○ |
| Example 14 | ◎ | ○ | ○ | ○ |
| Example 15 | ○ | ○ | ○ | ○ |
| Example 16 | ○ | Δ | ○ | ○ |
| Example 17 | ○ | ○ | ○ | ○ |
| Example 18 | ◎ | ○ | ○ | Δ |
| Example 19 | ◎ | ○ | ○ | Δ |
| Example 20 | ◎ | ○ | ○ | ○ |
| Example 21 | ○ | ○ | ○ | ○ |
| Example 22 | Δ | Δ | Δ | Δ |
| Comparative example 6 | X | ◎ | Δ | ○ |
| Comparative example 7 | ○ | ○ | X | Δ |
| Comparative example 8 | X | X | Δ | ○ |
| Comparative example 9 | ○ | X | Δ | ○ |
| Comparative example 10 | ○ | X | Δ | ○ |
| Comparative example 11 | ◎ | Δ | Δ | X |
| Comparative example 12 | ◎ | X | X | Δ |
| Comparative example 13 | ◎ | X | X | X |
| Comparative example 14 | ○ | X | X | ○ |

EXPLANATION OF NUMERALS

1 . . . substrate
2 . . . peeling layer
3 . . . protective layer
3A . . . first protective layer
3B . . . second protective layer
4 . . . adhesive layer
5 . . . back face layer
10 . . . protective layer transfer sheet
20 . . . transferable protective layer
30 . . . transfer layer
50 . . . receiving layer
100 . . . intermediate transfer medium

The invention claimed is:

1. A protective layer transfer sheet comprising:

a substrate, a first protective layer peelably provided on a surface of the substrate, and a second protective layer being in contact directly with the first protective layer, the first protective layer and the second protective layer being layered in this order from the substrate;

the first protective layer including an epoxy-cured resin, the epoxy-cured resin being a curing reaction product of a reactive resin having a functional group capable of reacting with an epoxy group and having a glass transition temperature (Tg) of not less than 60° C., and an epoxy curing agent; and the second protective layer including a polyester resin having a number-average molecular weight (Mn) of not less than 8000 and a glass transition temperature (Tg) of not less than 45° C.

2. The protective layer transfer sheet according to claim 1, wherein the reactive resin has a weight average molecular weight (Mw)of not less than 15,000 and not more than 70,000.

3. The protective layer transfer sheet according to claim 1 wherein the reactive resin is an amino-modified acrylic resin.

4. The protective layer transfer sheet according to claim 1, wherein the content of the polyester resin is not less than 30% by weight, on the basis of the total solid content of the second protective layer.

5. An intermediate transfer medium comprising:

a substrate and a first protective layer peelably provided on a surface of the substrate, a second protective layer being in contact directly with the first protective layer and a receiving layer;

the first protective layer, the second protective layer, and the receiving layer being layered in this order from the substrate;

the first protective layer including an epoxy-cured resin, the epoxy-cured resin being a curing reaction product of a reactive resin having a functional group capable of reacting with an epoxy group and having a glass transition temperature (Tg) of not less than 60° C., and an epoxy curing agent; and the second protective layer including a polyester resin having a number-average molecular weight (Mn) of not less than 8000 and a glass transition temperature (Tg) of not less than 45° C.

6. A protective layer transfer sheet Comprising:

a substrate and a first protective layer peelably provided on a surface of the substrate and a second protective layer being in contact directly with the first protective layer;

the first protective layer and the second protective layer being layered in this order from the substrate;

the first protective layer including a cured resin, the cured resin being a curing product of a reactive resin having a functional group capable of reacting with a curing agent, and the curing agent; and the second protective layer including a polyester resin having a number-average molecular weight (Mn) of not less than 8000 and a glass transition temperature (Tg) of not less than 45° C.

7. The protective layer transfer sheet according to claim 6, wherein the reactive resin having a functional group reactive with the curing agent is an acrylic polyol resin having a glass transition temperature (Tg) of not less than 50° C.

8. The protective layer transfer sheet according to claim 6, wherein the content of the polyester resin is not less than 30% by weight, on the basis of the total solid content of the second protective layer.

9. An intermediate transfer medium comprising:

a substrate and a first protective layer peelably provided on a surface of the substrate, a second protective layer being in contact directly with the first protective layer and a receiving layer, the first protective layer, the second protective layer and the receiving layer being layered in this order from the substrate, the first protective layer including a cured resin, the cured resin being a curing reaction product of a reactive resin having a functional group capable of reacting with a curing agent, and the curing agent; and the second protective layer including a polyester resin having a number-average molecular weight (Mn) of not less than 8000 and a glass transition temperature (Tg) of not less than 45° C.

10. A protective layer transfer sheet comprising:

a substrate and a protective layer peelably provided on a surface of the substrate;

the protective layer including an epoxy-cured resin, the epoxy-cured resin being a curing reaction product of a reactive resin having a functional group capable of reacting with an epoxy group, and an epoxy curing agent; and the reactive resin having a glass transition temperature (Tg) of not less than 60° C.

11. The protective layer transfer sheet according to claim 10, wherein the reactive resin has a weight average molecular weight (Mw) of the reactive resin is not less than 15,000 and not more than 70,000.

12. The protective layer transfer sheet according to claim 10, wherein the reactive resin is an amino-modified acrylic resin.

13. The protective layer transfer sheet according to claim 10, further comprising a peeling layer, the peeling layer being peelable from the substrate, and being provided between the substrate and the protective layer.

14. An intermediate transfer medium comprising:

a substrate, a protective layer and a receiving layer layered on a surface of the substrate;

the protective layer being peelable from the substrate;

the protective layer including an epoxy-cured resin, the epoxy-cured resin being a curing reaction product of a reactive resin having a functional group capable of reacting with an epoxy group, and an epoxy curing agent; and the reactive resin having a glass transition temperature (Tg) of not less than 60° C.

* * * * *